United States Patent
King et al.

(10) Patent No.: US 9,508,198 B1
(45) Date of Patent: Nov. 29, 2016

(54) METERS AND UPGRADED METER COVER WITH SENSOR

(71) Applicant: IPS GROUP INC., San Diego, CA (US)

(72) Inventors: David William King, Rancho Santa Fe, CA (US); Alexander Schwarz, San Diego, CA (US); Stephen John Hunter, Randpark Extension 4 (ZA); Chad P. Randall, San Diego, CA (US)

(73) Assignee: IPS GROUP INC., San Diego, CA (US)

( * ) Notice: Subject to any disclaimer, the term of this patent is extended or adjusted under 35 U.S.C. 154(b) by 0 days.

(21) Appl. No.: 14/979,104

(22) Filed: Dec. 22, 2015

Related U.S. Application Data

(60) Provisional application No. 62/096,477, filed on Dec. 23, 2014.

(51) Int. Cl.
*G08G 5/00* (2006.01)
*G07B 15/02* (2011.01)
*H04Q 9/00* (2006.01)

(52) U.S. Cl.
CPC ............. *G07B 15/02* (2013.01); *H04Q 9/00* (2013.01); *H04Q 2209/43* (2013.01); *H04Q 2209/80* (2013.01); *H04Q 2209/886* (2013.01)

(58) Field of Classification Search
CPC .. G07F 17/246; G07F 17/248; G01S 17/026; G08G 1/14; G06Q 30/0284
USPC ...................................................... 340/932.2
See application file for complete search history.

(56) References Cited

U.S. PATENT DOCUMENTS

| 2,161,046 A | 6/1939 | Hitzeman |
| 2,822,682 A | 2/1958 | Sollenberger |
| 2,832,506 A | 4/1958 | Hatcher |
| D189,106 S | 10/1960 | George |

(Continued)

FOREIGN PATENT DOCUMENTS

| CA | 2377010 A1 | 10/2001 |
| CA | 2363915 A1 | 5/2003 |

(Continued)

OTHER PUBLICATIONS

Cell Net Data Systems. First Wireless Monitoring of Parking Meters Results in Theft Arrests Using CellNet Data Systems Technology. PRNewswire. May 11, 1999.

(Continued)

*Primary Examiner* — Hai Phan
*Assistant Examiner* — Son M Tang
(74) *Attorney, Agent, or Firm* — Wilson, Sonsini, Goodrich & Rosati

(57) ABSTRACT

Meters and meter covers comprising: a removable cover housing configured to accommodate the upper portion of the internal components of an existing meter, the cover housing engageable with the housing base of the existing meter to cover and enclose the internal components of the existing meter; a sensor affixed to the cover housing, the sensor configured to collect environmental information pertaining to the local external environment of the existing meter; a wireless radio affixed to the cover housing, the wireless radio configured to transmit the environmental information to the existing meter or to a remote server in communication with the existing meter; and a power unit affixed to the cover housing, the power unit supplying power to the sensor and the wireless radio.

26 Claims, 18 Drawing Sheets

(56) References Cited

U.S. PATENT DOCUMENTS

| | | |
|---|---|---|
| 2,988,191 A | 6/1961 | Grant |
| 3,183,411 A | 5/1965 | Palfi |
| 3,535,870 A | 10/1970 | Mitchell |
| 3,721,463 A | 3/1973 | Attwood et al. |
| 3,999,372 A | 12/1976 | Welch et al. |
| 4,043,117 A | 8/1977 | Maresca et al. |
| 4,812,805 A | 3/1989 | Lachat et al. |
| 4,823,928 A | 4/1989 | Speas |
| 4,825,425 A | 4/1989 | Turner |
| 4,875,598 A | 10/1989 | Dahl |
| 4,880,097 A | 11/1989 | Speas |
| 4,895,238 A | 1/1990 | Speas |
| 5,065,156 A | 11/1991 | Bernier |
| 5,222,076 A | 6/1993 | Ng et al. |
| 5,244,070 A | 9/1993 | Carmen et al. |
| 5,273,151 A | 12/1993 | Carmen et al. |
| 5,360,095 A | 11/1994 | Speas |
| 5,442,348 A | 8/1995 | Mushell |
| 5,471,139 A | 11/1995 | Zadoff |
| 5,563,491 A | 10/1996 | Tseng |
| 5,614,892 A | 3/1997 | Ward, II et al. |
| 5,617,942 A | 4/1997 | Ward, II et al. |
| 5,640,002 A | 6/1997 | Ruppert et al. |
| 5,642,119 A | 6/1997 | Jacobs |
| 5,648,906 A | 7/1997 | Amirpanahi |
| 5,659,306 A | 8/1997 | Bahar |
| 5,710,743 A * | 1/1998 | Dee .................. G07F 17/248 194/217 |
| 5,737,710 A | 4/1998 | Anthonyson |
| 5,777,951 A * | 7/1998 | Mitschele .......... G07F 17/246 368/90 |
| 5,778,067 A | 7/1998 | Jones et al. |
| 5,806,651 A | 9/1998 | Carmen et al. |
| D400,115 S | 10/1998 | Yaron et al. |
| 5,833,042 A | 11/1998 | Baitch et al. |
| 5,841,369 A | 11/1998 | Sutton et al. |
| 5,842,411 A | 12/1998 | Johnson |
| 5,845,268 A | 12/1998 | Moore |
| 5,852,411 A | 12/1998 | Jacobs et al. |
| 5,954,182 A | 9/1999 | Wei |
| 6,037,880 A | 3/2000 | Manion |
| 6,078,272 A | 6/2000 | Jacobs et al. |
| 6,081,205 A | 6/2000 | Williams |
| 6,111,522 A | 8/2000 | Hiltz et al. |
| 6,116,403 A | 9/2000 | Kiehl |
| 6,195,015 B1 | 2/2001 | Jacobs et al. |
| D439,591 S | 3/2001 | Reidt et al. |
| 6,229,455 B1 * | 5/2001 | Yost .................... G07F 17/24 340/932.2 |
| 6,230,868 B1 | 5/2001 | Tuxen et al. |
| D447,714 S | 9/2001 | Cappiello |
| D449,010 S | 10/2001 | Petrucelli |
| 6,309,098 B1 | 10/2001 | Wong |
| 6,312,152 B2 * | 11/2001 | Dee .................. 194/217 |
| RE37,531 E | 1/2002 | Chaco et al. |
| D454,807 S | 3/2002 | Cappiello |
| 6,373,422 B1 | 4/2002 | Mostafa |
| D461,728 S | 8/2002 | Tuxen et al. |
| 6,456,491 B1 | 9/2002 | Flannery et al. |
| D463,749 S | 10/2002 | Petrucelli |
| 6,457,586 B2 | 10/2002 | Yasuda et al. |
| 6,505,774 B1 | 1/2003 | Fulcher et al. |
| 6,697,730 B2 | 2/2004 | Dickerson |
| 6,747,575 B2 | 6/2004 | Chauvin et al. |
| 6,856,922 B1 | 2/2005 | Austin et al. |
| 6,914,411 B2 | 7/2005 | Couch et al. |
| 6,929,179 B2 | 8/2005 | Fulcher et al. |
| 7,019,420 B2 | 3/2006 | Kogan et al. |
| 7,019,670 B2 | 3/2006 | Bahar |
| 7,027,773 B1 | 4/2006 | McMillin |
| 7,029,167 B1 | 4/2006 | Mitschele |
| 7,183,999 B2 | 2/2007 | Matthews et al. |
| 7,222,031 B2 | 5/2007 | Heatley |
| 7,237,716 B2 | 7/2007 | Silberberg |
| 7,388,349 B2 | 6/2008 | Elder et al. |
| D575,168 S | 8/2008 | King et al. |
| D587,141 S | 2/2009 | King et al. |
| 7,748,620 B2 | 7/2010 | Gomez et al. |
| 7,772,720 B2 | 8/2010 | McGee et al. |
| 7,806,248 B2 | 10/2010 | Hunter et al. |
| 7,854,310 B2 * | 12/2010 | King ...................... 194/350 |
| 7,855,661 B2 | 12/2010 | Ponert |
| 7,933,841 B2 | 4/2011 | Schmeyer et al. |
| D654,816 S | 2/2012 | Mackay et al. |
| D656,046 S | 3/2012 | Mackay et al. |
| 8,138,950 B1 | 3/2012 | Leung |
| D661,603 S | 6/2012 | Mackay et al. |
| 8,279,107 B2 | 10/2012 | Krstanovic et al. |
| 8,395,532 B2 | 3/2013 | Chauvin et al. |
| 8,479,909 B2 | 7/2013 | King et al. |
| 8,513,832 B2 | 8/2013 | Hunter et al. |
| 8,566,159 B2 | 10/2013 | King et al. |
| D692,784 S | 11/2013 | Anderssen et al. |
| 8,590,687 B2 * | 11/2013 | King .................. G06Q 20/127 194/350 |
| 8,595,054 B2 * | 11/2013 | King .................. G06Q 20/127 340/870.02 |
| 8,631,921 B2 | 1/2014 | Jones et al. |
| 8,684,158 B2 | 4/2014 | Jones et al. |
| D705,090 S | 5/2014 | Mackay et al. |
| D707,140 S | 6/2014 | King et al. |
| D707,141 S | 6/2014 | King et al. |
| D707,142 S | 6/2014 | King et al. |
| 8,749,403 B2 | 6/2014 | King et al. |
| 8,770,371 B2 * | 7/2014 | MacKay ............... G07F 17/248 194/350 |
| 8,862,494 B2 * | 10/2014 | King .................. 705/13 |
| 9,002,723 B2 | 4/2015 | King et al. |
| 9,047,712 B2 | 6/2015 | King et al. |
| 9,127,964 B2 * | 9/2015 | Schwarz |
| D749,000 S | 2/2016 | King et al. |
| D750,513 S | 3/2016 | King et al. |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0111768 A1 | 8/2002 | Ghorayeb et al. |
| 2003/0092387 A1 | 5/2003 | Hjelmvik |
| 2003/0112597 A1 | 6/2003 | Smith |
| 2003/0121754 A1 | 7/2003 | King |
| 2003/0128010 A1 | 7/2003 | Hsu |
| 2003/0128136 A1 | 7/2003 | Spier et al. |
| 2003/0140531 A1 | 7/2003 | Pippins |
| 2003/0144972 A1 | 7/2003 | Cordery et al. |
| 2003/0169183 A1 | 9/2003 | Korepanov et al. |
| 2003/0179107 A1 | 9/2003 | Kibria et al. |
| 2003/0220835 A1 | 11/2003 | Barnes, Jr. |
| 2003/0222792 A1 | 12/2003 | Berman et al. |
| 2004/0068434 A1 | 4/2004 | Kanekon |
| 2004/0084278 A1 | 5/2004 | Harris et al. |
| 2004/0181496 A1 | 9/2004 | Odinotski et al. |
| 2004/0264302 A1 | 12/2004 | Ward |
| 2005/0040951 A1 | 2/2005 | Zalewski et al. |
| 2005/0178639 A1 | 8/2005 | Brumfield et al. |
| 2005/0192911 A1 | 9/2005 | Mattern |
| 2006/0021848 A1 | 2/2006 | Smith |
| 2006/0116972 A1 | 6/2006 | Wong |
| 2006/0149684 A1 | 7/2006 | Matsuura et al. |
| 2006/0152349 A1 | 7/2006 | Ratnakar |
| 2006/0267799 A1 | 11/2006 | Mendelson |
| 2007/0016539 A1 | 1/2007 | Groft et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0136128 A1 | 6/2007 | Janacek et al. |
| 2007/0184852 A1 | 8/2007 | Johnson et al. |
| 2007/0210935 A1 | 9/2007 | Yost et al. |
| 2007/0285281 A1 | 12/2007 | Welch et al. |
| 2008/0071611 A1 | 3/2008 | Lovett |
| 2008/0093454 A1 | 4/2008 | Yamazaki et al. |
| 2008/0147268 A1 | 6/2008 | Fuller |
| 2008/0208680 A1 | 8/2008 | Cho |
| 2008/0238715 A1 | 10/2008 | Cheng et al. |
| 2009/0109062 A1 | 4/2009 | An |
| 2009/0183966 A1 * | 7/2009 | King .................. G06Q 50/30 |

(56) References Cited

U.S. PATENT DOCUMENTS

| | | | | |
|---|---|---|---|---|
| | | | | 194/217 |
| 2009/0192950 | A1 | 7/2009 | King et al. | |
| 2009/0267732 | A1 | 10/2009 | Chauvin et al. | |
| 2009/0284907 | A1 | 11/2009 | Regimbal et al. | |
| 2009/0315720 | A1 | 12/2009 | Clement et al. | |
| 2010/0106517 | A1 | 4/2010 | Kociubinski et al. | |
| 2010/0188932 | A1 | 7/2010 | Hanks et al. | |
| 2010/0332394 | A1* | 12/2010 | Ioli | G06Q 20/40 |
| | | | | 705/44 |
| 2011/0063133 | A1 | 3/2011 | Keller et al. | |
| 2011/0313822 | A1 | 12/2011 | Burdick | |
| 2012/0158466 | A1* | 6/2012 | John | G07B 15/02 |
| | | | | 705/13 |
| 2012/0222935 | A1 | 9/2012 | Mackay et al. | |
| 2012/0285790 | A1 | 11/2012 | Jones et al. | |
| 2012/0285792 | A1* | 11/2012 | Jones | G07B 15/02 |
| | | | | 194/217 |
| 2012/0285793 | A1* | 11/2012 | Jones | G07B 15/02 |
| | | | | 194/217 |
| 2013/0005445 | A1 | 1/2013 | Walker et al. | |
| 2013/0099943 | A1 | 4/2013 | Subramanya | |
| 2013/0285455 | A1 | 10/2013 | Hunter et al. | |
| 2014/0040028 | A1 | 2/2014 | King et al. | |
| 2014/0108107 | A1 | 4/2014 | Jones et al. | |
| 2014/0129158 | A1* | 5/2014 | Shea | G01L 1/142 |
| | | | | 702/57 |
| 2014/0172518 | A1 | 6/2014 | King et al. | |
| 2014/0174881 | A1 | 6/2014 | King et al. | |
| 2014/0210646 | A1* | 7/2014 | Subramanya | B61L 29/28 |
| | | | | 340/928 |
| 2014/0289025 | A1 | 9/2014 | King et al. | |
| 2015/0084786 | A1 | 3/2015 | King et al. | |
| 2015/0106172 | A1* | 4/2015 | Salama | G07F 17/246 |
| | | | | 705/13 |
| 2015/0235503 | A1 | 8/2015 | King et al. | |

FOREIGN PATENT DOCUMENTS

| | | | |
|---|---|---|---|
| EP | 0329129 | A2 | 8/1989 |
| EP | 0980055 | B1 | 9/2001 |
| EP | 1128350 | B1 | 10/2007 |
| FR | 2837583 | A1 | 9/2003 |
| IL | 149880 | A | 6/2007 |
| JP | S5259000 | A | 5/1977 |
| JP | S58121494 | A | 7/1983 |
| JP | 2002099640 | A | 4/2002 |
| JP | 2005267430 | A | 9/2005 |
| KR | 20050038077 | A | 4/2005 |
| WO | WO-2005031494 | A2 | 4/2005 |
| WO | WO-2006095352 | A2 | 9/2006 |
| WO | WO-2009154787 | A2 | 12/2009 |
| WO | 2014014494 | A1 | 1/2014 |

OTHER PUBLICATIONS

City of Culver City. CA Agenda Item Report. Approval of a Contract with IPS Group Inc., for the Sole-Source Purchase of 1,000 Parking Meters. Dec. 12, 2001.

Co-pending U.S. Appl. No. 14/811,641, filed Jul. 28, 2015.
Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.
Flatley. In San Francisco, Hackers Park for Free. Read filed under Misc. Gadgets, downloaded from www.engadget.com website on May 3, 2010, originally posted on Jul. 31, 2009, 5 pages.
Howland. How M2M Maximizes Denver's Revenue. Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.
Meter Solutions, Single-Space Meters brochure, downloaded from www.duncansolutions.com website, revised Apr. 2006, 2 pages.
PCT/IB2006/054574 International Preliminary Report on Patentability dated Mar. 10, 2009.
PCT/IB2006/054574 International Search Report dated Oct. 27, 2008.
PCT/US2010/047906 International Preliminary Report on Patentability dated Mar. 6, 2012.
PCT/US2010/047906 International Search Report dated Mar. 30, 2011.
PCT/US2010/047907 International Preliminary Report on Patentability dated Mar. 15, 2012.
PCT/US2010/047907 International Search Report dated Apr. 26, 2011.
PCT/US2012/048190 International Search Report dated Jan. 22, 2013.
Petition for Inter Partes Review of U.S. Pat. No. 7,854,310. IPR Case No. IPR2016-00067, filed Oct. 22, 2015.
Petition for Inter Partes Review of U.S. Pat. No. 7,854,310. IPR Case No. IPR2016-00068, filed Oct. 22, 2015.
Petition for Inter Partes Review of U.S. Pat. No. 8,595,054. IPR Case No. IPR2016-00069, filed Oct. 22, 2015.
Petition for Inter Partes Review of U.S. Pat. No. 8,595,054. IPR Case No. IPR2016-00070, filed Oct. 22, 2015.
Sedadi. Card & Coin Parking Meter Lease. City of Los Angeles Inter-Departmental Correspondence. Nov. 29, 2010.
Spyker et al Predicting Capacitor Run Time for a Battery/Capacitor Hybrid Source. Power Electronic Drives and Energy Systems for Industrial Growth. 1998. Proceedings. 1998 International Conference.
The U.S. Conference of Mayors Presents 'Best Practice' Awards, Los Angeles, New Orleans, Elizabeth, N.J. and Long Beach, CA Honored for Excellence & Innovation in Public-Private partnerships, Press Release Jan. 20, 2012.
Transportation Commission Staff Report. Alternate Downtown Parking Pay Technology.Agenda Item No. 5.b (Oct. 20, 2011).
Tung. Design of an advanced on-street parking meter. RIT Scholar Works. Thesis/Dissertation Collections (2001).
Decision Denying Institution of Inter Partes Review dated Mar. 30, 2016 of U.S. Pat. No. 7,854,310. IPR Case No. IPR2016-00068.
Decision Denying Inter Partes Review dated Apr. 1, 2016 of U.S. Pat. No. 8,595,054. IPR Case No. IPR2016-00069.
Decision Denying Inter Partes Review dated Apr. 1, 2016 of U.S. Pat. No. 8,595,054. IPR Case No. IPR2016-00070.
Institution of Inter Partes Review dated Mar. 30, 2016 of U.S. Pat. No. 7,854,310. IPR Case No. IPR2016-00067.
Co-pending U.S. Appl. No. 29/520,918, filed Mar. 18, 2015.
Co-pending U.S. Appl. No. 29/521,401, filed Mar. 23, 2015.
Co-pending U.S. Appl. No. 15/208,056, filed Jul. 12, 2016.

* cited by examiner

METERS AND UPGRADED METER COVER WITH SENSOR

CROSS-REFERENCE TO RELATED APPLICATIONS

This application claims the benefit of U.S. Application Ser. No. 62/096,477, filed Dec. 23, 2014, which is incorporated by reference in its entirety.

BACKGROUND OF THE INVENTION

Vehicle sensing and wireless communication capabilities improve the functionality of street parking meters. Parking meters including such technologies are able to offer higher levels of service to both consumers and municipalities. Parking meters with vehicle sensing and wireless communication capabilities also offer enhanced ability to accommodate refined schemes of rates and time limits. Current practices adopted for replacing existing parking meters with technologically advanced upgraded versions involve labor intensive and expensive steps, such as coring of the asphalt surface of a street or sidewalk, replacement of all the internal components of an existing meter, or complete removal of an existing meter and installation of a new meter.

SUMMARY OF THE INVENTION

The present invention provides a fast and convenient upgrade procedure to add vehicle sensing capability to an existing parking meter by requiring only the simple step of installing a new removable cover housing onto an existing meter. In some embodiments, the removable cover housings described herein are self-contained, having an independent power source and communications element. In further embodiments, the removable cover housings described herein do not require an electrical connection to an existing meter. For example, in some embodiments, the removable cover housing is physically associated with an existing meter and optionally in wireless communication with the existing parking meter mechanism, but does not require a functional, wired, electrical connection to any component of the existing meter. This feature facilitates rapid, low-cost upgrades, reduces operating and maintenance costs, and results in a more modular system that is easier to upgrade further in the future.

The removable cover housings described herein are compatible with, and can be retrofitted to, a wide range of existing meters. Further, the removable cover housings are designed such that the internal components, e.g., sensor, wireless radio transmitter, RF tag reader, solar cell battery, etc. are not visible at all from the outside, thereby protecting the parking meter against possible acts of vandalism. Parking meters fitted with the removable cover housings described herein can be serviced easily.

In some embodiments, the removable cover housing comprises a vehicle sensor. In further embodiments, the removable cover housing comprises components needed to wirelessly engage with a unique RF tag that is affixed to the existing meter. In such embodiments, the removable cover housing optionally obtains a unique location-specific identifier from the RF tag and transmits the identifier to a remote server where configuration information pertaining to local environments is collected and stored. In this way, the removable cover housings described herein provide a streamlined upgrade process whereby the cover housing is applied to an existing meter, obtains the associated identifier, and uses the identifier to request its intended configuration information and operating parameters from the remote database. In various embodiments, the remote server is a remote database hosted on a cloud system. In further embodiments, the removable cover housing optionally obtains a unique location-specific identifier from the RF tag directly as a means to identify its location.

In one aspect, disclosed herein are meter covers comprising: a removable cover housing configured to accommodate the upper portion of the internal components of an existing meter, the cover housing engageable with the housing base of the existing meter to cover and enclose the internal components of the existing meter; a sensor affixed to the cover housing, the sensor configured to collect environmental information pertaining to the local external environment of the existing meter; a wireless radio affixed to the cover housing, the wireless radio configured to transmit the environmental information to the existing meter or to a remote server in communication with the existing meter; and a power unit affixed to the cover housing, the power unit supplying power to the sensor and the wireless radio. In some embodiments, the meter is a parking meter and the sensor is a vehicle sensor. In some embodiments, the environmental information comprises the presence of a vehicle in a parking space associated with the existing meter. In further embodiments, parking meter is a single space parking meter. In other embodiments, parking meter is a multi-space parking meter. In still further embodiments, the cover housing comprises left and right flares adapted to house the environmental sensor in left or right positions to collect information pertaining to the local external environment to the left or right of the existing meter. In some embodiments, the sensor utilizes radar, infrared light or ultrasonic waves. In a particular embodiment, the sensor is a radar. In further embodiments, the cover housing comprises a material that is at least partially radar transparent. In various embodiments, the cover housing comprises material that allows sunlight to pass through to a solar panel. In still further embodiments, the cover housing comprises polycarbonate, ABS, or a combination thereof. In some embodiments, the sensor is mounted on a gimbal to facilitate positioning the sensor. In some embodiments, the radio is a wireless radio utilizes ISM-band, Wi-Fi, Bluetooth, or ZigBee. In some embodiments, the meter cover further comprises an RF reader affixed to the cover housing and configured to receive a meter identification, a meter location, or a combination thereof, from a wireless tag associated with the existing meter. In other embodiments, the meter cover comprises an RF reader affixed to the cover housing and is configured to receive a meter identification, a meter location, or a combination thereof, through a wired connection to the meter. In further embodiments, the wireless radio is further configured to transmit the meter identification in association with the environmental information. In some embodiments, the meter cover is operationally self-sufficient, the sensor, the wireless radio, and the power unit being not electrically connected to the existing meter.

In another aspect, disclosed herein are meters comprising: a housing base; a meter device at least partially disposed in the housing base; a removable cover housing configured to accommodate the upper portion of the meter device, the cover housing reversibly engageable with the housing base to cover and enclose the meter device; a sensor affixed to the cover housing, the sensor configured to collect environmental information pertaining to the local external environment of the meter; a wireless radio affixed to the cover housing, the wireless radio configured to transmit the environmental information to the meter device or to a remote server in communication with the meter device; and a power unit affixed to the cover housing, the power unit supplying power to the sensor and the wireless radio. In some embodiments, the meter is a parking meter and the sensor is a vehicle sensor. In some embodiments, the environmental information comprises the presence of a vehicle in a parking space associated with the meter. In further embodiments, parking meter is a single space parking meter. In other embodiments, parking meter is a multi-space parking meter. In further embodiments, the cover housing comprises left and right flares adapted to house the environmental sensor in left or right positions to collect information pertaining to the local external environment to the left or right of the meter. In a particular embodiment, the left and right flares contain independent sensors configurable to collect information to the left and to the right of the parking meter. In other embodiments, the independent sensors are optionally oriented in different horizontal and vertical configurations to optimize the directions of the sensors. In this way, sensor direction can be optimized independent of meter location. In some embodiments, the sensor utilizes radar, infrared light or ultrasonic waves. In a particular embodiment, the sensor is a radar. In further embodiments, the cover housing comprises a material that is at least partially radar transparent. In still further embodiments, the cover housing comprises polycarbonate, ABS, or a combination thereof. In even further embodiments, the cover housing comprises paint or shielding to further optimize RF signal detection, transmission, and reception. In some embodiments, the sensor is mounted on a gimbal to facilitate positioning the sensor. In some embodiments, the radio is a wireless radio utilizes ISM-band, Wi-Fi, Bluetooth, or ZigBee. In some embodiments, the cover housing further comprises an RF reader affixed to the cover housing and configured to receive a meter identification, a meter location, or a combination thereof, from a wireless tag associated with the existing meter. In further embodiments, the wireless radio is further configured to transmit the meter identification in association with the environmental information. In some embodiments, the meter cover is operationally self-sufficient, the sensor, the wireless radio, and the power unit being not electrically connected to the meter device. In various embodiments, the operationally self-sufficient meter cover is able to wirelessly communicate with the remote server independent of the existing meter. In even further embodiments, the wireless radio transmitter can be used to communicate directly to a database, a user, an enforcement officer, or a maintenance technician. For example, the wireless radio can communicate information to a handheld device, e.g., a cellular device or an equivalent, to transmit various types of enforcement data (e.g., meter identification, meter location, vehicle identification, license plate information, vehicle registration information, citation history, data indicating issuance of a citation, data related to the type of citation issued, etc.) to parking enforcement personnel.

In another aspect, disclosed herein are methods of upgrading a meter comprising: disengaging a cover housing from the housing base of an existing meter to expose an internal meter device; removing the cover housing; replacing the cover housing; and engaging the replacement cover housing with the housing base to cover and enclose the meter device; provided that the replacement cover housing comprises: a sensor affixed to the cover housing, the sensor configured to collect environmental information pertaining to the local external environment of the meter; a wireless radio affixed to the cover housing, the wireless radio configured to transmit the environmental information to the meter device or to a remote server in communication with the meter device; and a power unit affixed to the cover housing, the power unit supplying power to the sensor and the wireless radio; whereby the meter is upgraded. In some embodiments, the meter is a parking meter and the sensor is a vehicle sensor. In some embodiments, the method further comprises removing and replacing the meter device. In some embodiments, the internal meter device of the existing meter is not replaced. In some embodiments, the method comprises removing and replacing only a portion of the cover housing; wherein the portion of the cover housing comprises: a sensor affixed to the left and right flares of the portion of the cover housing, the sensor configured to collect environmental information pertaining to the local external environment of the meter; a wireless radio affixed to portion of the cover housing, the wireless radio configured to transmit the environmental information to the meter device or to a remote server in communication with the meter device; and a power unit affixed to the portion of the cover housing, the power unit supplying power to the sensor and the wireless radio. Removing and replacing only a portion of the cover housing further reduces waste and affords greater upgrade flexibility.

In another aspect, disclosed herein are methods of upgrading a meter comprising: disengaging a portion of a cover housing from a cover housing of an existing meter; removing the portion of the cover housing; replacing the portion of the cover housing; and engaging a replacement portion of the cover housing with the cover housing of the existing meter; provided that an internal meter device of the existing meter is not replaced; provided that the portion of the cover housing comprises less than 75%, 50%, or 25% of the cover housing; provided that the replacement portion of the cover housing comprises: a sensor affixed to the portion of the cover housing, the sensor configured to collect environmental information pertaining to the local external environment of the meter; a wireless radio affixed to the portion of the cover housing, the wireless radio configured to transmit the environmental information to the meter device or to a remote server in communication with the meter device; and a power unit affixed to the portion of the cover housing, the power unit supplying power to the sensor and the wireless radio; whereby the meter is upgraded.

DETAILED DESCRIPTION OF THE INVENTION

Figure 1:
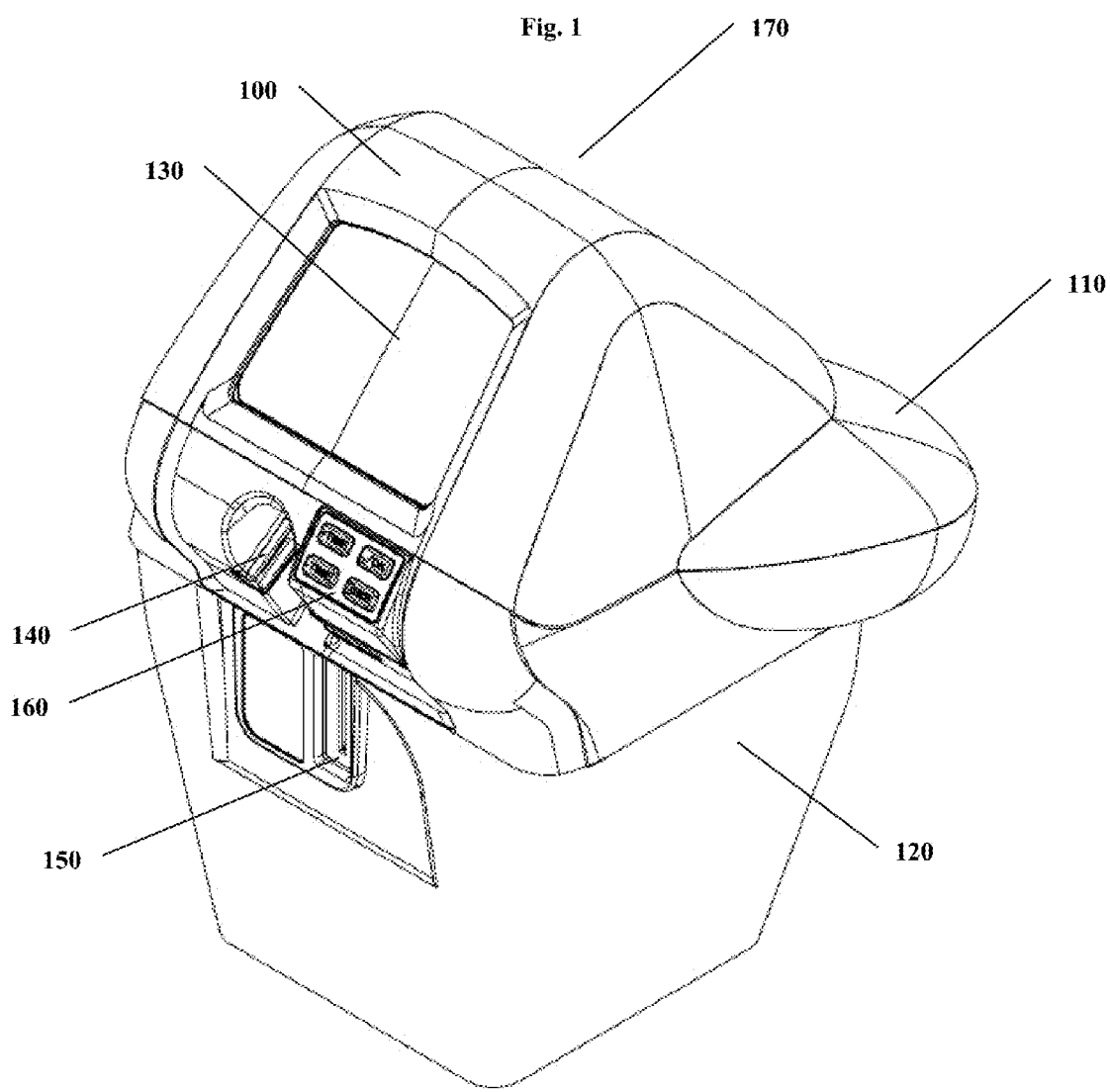
FIG. 1 shows a non-limiting example of an upgraded meter described herein; in this case, a top front perspective view of an exemplary meter.
Figure 2:
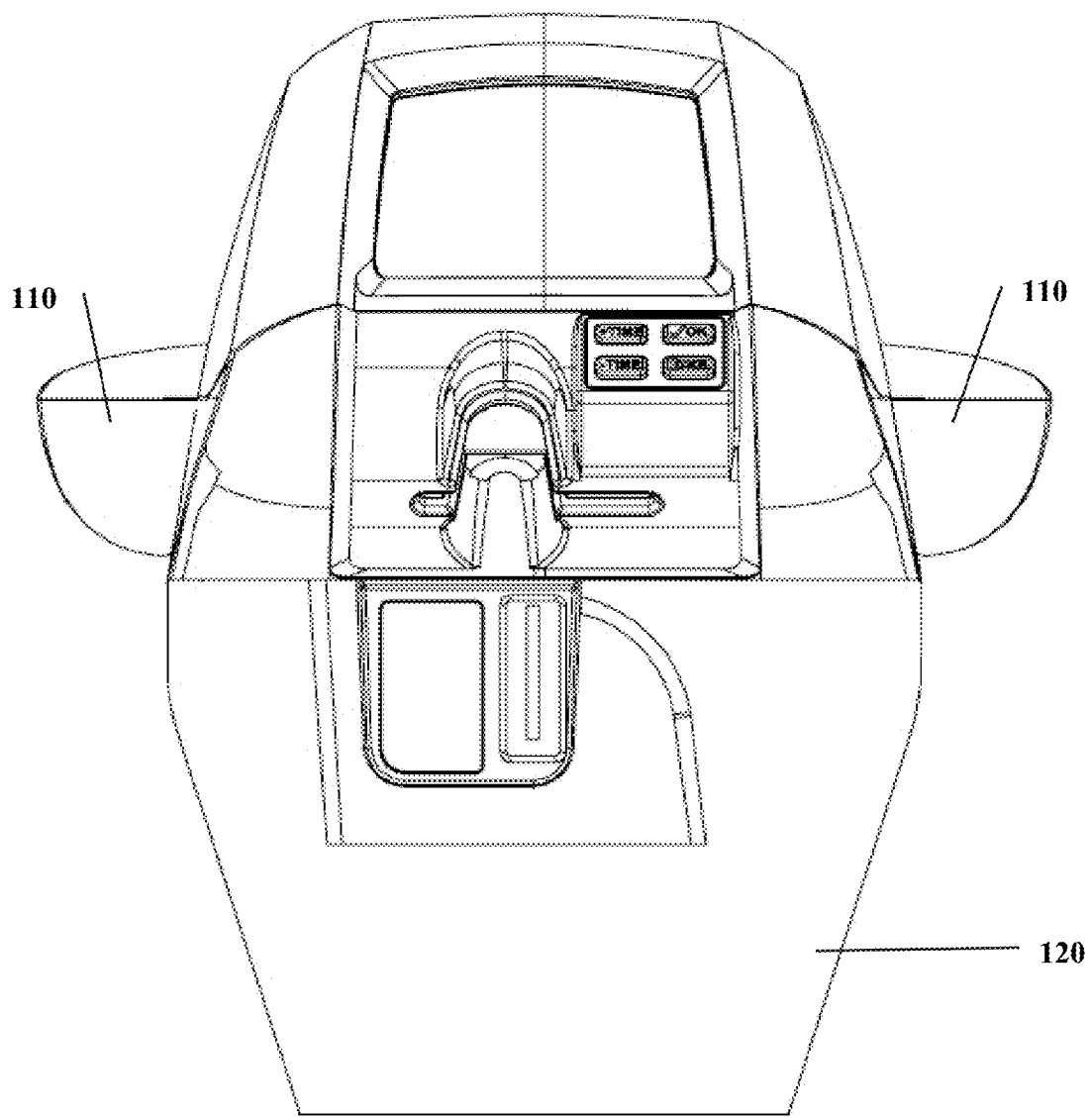
FIG. 2 shows a non-limiting example of an upgraded meter described herein; in this case, a front view of an exemplary meter.

Traditional street parking meters are in the process of being phased out and replaced by meters that are enabled to accept modern methods of payments, e.g., credit cards, debit cards, smart cards, pay-by-phone, etc. Replacement and installation of an entirely new unit is costly for cities, municipalities, or other authorities in charge of street parking meters, thereby causing eventual increase in parking rates to recover the cost of purchase and installation. Moreover, replacement and installation of an entirely new unit creates electronic waste. The cover housing described in the present invention, offers a cost effective and environmentally-friendly solution to the problem. The cover housing of the present invention can be easily fitted to existing street parking meters, even those that have previously been upgraded by replacing the internal meter mechanism. These replacements further allow for sensor replacement, upgrades, or additions. Installations of sensors in existing street meters typically involve excessive road work, drilling, and infrastructure modifications on street lights, utility poles, and underground wiring. The replacement, upgrade, or addition of sensors using a replacement cover housing or an upgrade to a cover housing reduces waste, is easier to install, and is cheaper to maintain.

In certain embodiments, the cover housing of the present invention is completely solar powered. Street parking meters that are upgraded using a solar powered cover housing described herein do not need batteries to operate. This feature further reduces the operating cost of the street parking meters that are upgraded with cover housing described herein. In other embodiments, the dome sensor is completely battery powered, completely wire powered, and/or optionally solar powered.

In certain embodiments, the cover housing of the present invention is equipped with one or more sensors, for detection of vehicles within the local environment of the parking meter on which the housing is deployed, and a wireless radio transmitter to communicate, directly or indirectly, with a remote management or maintenance server. In certain embodiments, the cover housing is also equipped with a RF tag reader. The RF tag reader can be used to read a wireless RF tag located on the base of an existing parking meter, and acquire information regarding the local environment. Information about the local environment can then be communicated, via a wireless radio transmitter, also housed within the cover housing, to a remote management or maintenance server. This allows immediate communication between the upgraded parking meter and the remote maintenance or management server. In this way, the cover housing containing the sensor, RF tag reader, and wireless radio transmitter can communicate with a remote management or maintenance server and configure itself directly, independent of the meter housing.

Described herein, in certain embodiments, are meter covers comprising: a removable cover housing configured to accommodate the upper portion of the internal components of an existing meter, the cover housing engageable with the housing base of the existing meter to cover and enclose the internal components of the existing meter; a sensor affixed to the cover housing, the sensor configured to collect environmental information pertaining to the local external environment of the existing meter; a wireless radio affixed to the cover housing, the wireless radio configured to transmit the environmental information to the existing meter or to a remote server in communication with the existing meter; and a power unit affixed to the cover housing, the power unit supplying power to the sensor and the wireless radio.

Also described herein, in certain embodiments, are meter covers comprising: a removable portion of the cover housing configured to engage and disengage with the removable cover housing 100 comprising left and right flares of the cover housing 110; a sensor affixed to the left and right flares of the cover housing, the sensor configured to collect environmental information pertaining to the local external environment of the existing meter; a wireless radio affixed to the removable portion of the cover housing, the wireless radio configured to transmit the environmental information to the existing meter or to a remote server in communication with the existing meter; and a power unit affixed to the removable portion of the cover housing, the power unit supplying power to the sensor and the wireless radio.

Also described herein, in certain embodiments, are meters comprising: a housing base; a meter device at least partially disposed in the housing base; a removable cover housing configured to accommodate the upper portion of the meter device, the cover housing reversibly engageable with the housing base to cover and enclose the meter device; a sensor affixed to the cover housing, the sensor configured to collect environmental information pertaining to the local external environment of the meter; a wireless radio affixed to the cover housing, the wireless radio configured to transmit the environmental information to the meter device or to a remote server in communication with the meter device; and a power unit affixed to the cover housing, the power unit supplying power to the sensor and the wireless radio.

Also described herein, in certain embodiments, are methods of upgrading a meter comprising: disengaging a cover housing from the housing base of an existing meter to expose an internal meter device; removing the cover housing; replacing the cover housing; and engaging the replacement cover housing with the housing base to cover and enclose the meter device; provided that the replacement cover housing comprises: a sensor affixed to the cover housing, the sensor configured to collect environmental information pertaining to the local external environment of the meter; a wireless radio affixed to the cover housing, the wireless radio configured to transmit the environmental information to the meter device or to a remote server in communication with the meter device; and a power unit affixed to the cover housing, the power unit supplying power to the sensor and the wireless radio; whereby the meter is upgraded. In other embodiments, the method comprises removing and replacing only a portion of the cover housing; wherein the portion of the cover housing comprises: a sensor affixed to the left and right flares of the portion of the cover housing, the sensor configured to collect environmental information pertaining to the local external environment of the meter; a wireless radio affixed to portion of the cover housing, the wireless radio configured to transmit the environmental information to the meter device or to a remote server in communication with the meter device; and a power unit affixed to the portion of the cover housing, the power unit supplying power to the sensor and the wireless radio.

Also described herein, in certain embodiments, are methods of upgrading a meter comprising: disengaging a portion of a cover housing from a cover housing of an existing meter; removing the portion of the cover housing; replacing the portion of the cover housing; and engaging a replacement portion of the cover housing with the cover housing of the existing meter; provided that an internal meter device of the existing meter is not replaced; provided that the portion of the cover housing comprises less than 75%, 70%, 65%, 60%, 55%, 50%, 45%, 40%, 35%, 30%, 25%, or 20% of the cover housing; provided that the replacement portion of the cover housing comprises: a sensor affixed to the portion of the cover housing, the sensor configured to collect environmental information pertaining to the local external environment of the meter; a wireless radio affixed to the portion of the cover housing, the wireless radio configured to transmit the environmental information to the meter device or to a remote server in communication with the meter device; and a power unit affixed to the portion of the cover housing, the power unit supplying power to the sensor and the wireless radio; whereby the meter is upgraded.

The internal components of the cover housing and methods for carrying out meter upgrade using the cover housing are described in detail subsequent sections.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Cover Housing

In certain embodiments, existing parking meters are fitted with a removable cover housing 100 of the present invention. The cover housing comprises a base 120 and a dome 170. The cover housing further comprises a solar panel side facing away from a single parking spot in front of the parking meter or multiple parking spots to the left and right of the parking meter, a user interface side facing a single parking spot in front of the parking meter or multiple parking spots to the left and right of the parking meter. The solar panel side is adapted to be fitted with right and left flares 110, wherein an environmental sensor 820 is housed in the right flare and a C-cell battery 810 is housed in the left flare or vice versa. The user interface side comprises a display screen 130, a card reader 140, a unit comprising buttons to select parking durations and carry out payments 160, slots for accepting bills or coins 150. In other embodiments, the user interface side optionally includes a printer.

In other embodiments, existing parking meters are fitted with a removable portion of a cover housing. In further embodiments, the removable portion of a cover housing includes an environmental sensor, a wireless radio, and a power unit.

In some embodiments, the cover housing is at least partially made of a strong material that is resistant to theft, weather, and vandalism. Examples of materials suitable for cover housings include various metals, such as stainless steel, and the like. In further embodiments, the cover housing is at least partially made of a material that is at least partially transparent to radar, ultrasonic, infrared, or microwaves. Examples of transparent materials for cover housings include polycarbonate, ABS, or combinations thereof.

Referring to FIGS. 1, 2, 4, and 5, in a particular embodiment, an upgraded meter comprises a dome 170 which attaches to a base 120. The dome comprises left and right flares 110, which optionally house components comprising environmental sensors, batteries, RFID tag readers, wireless radio transmitters, or a combination thereof. The dome 170 optionally has a solar panel, and it further comprises a removable cover housing 100 that is replaceable to upgrade the dome 170. The dome further comprises a user interface side, which optionally comprises a display screen 130, a card reader 140, a unit comprising buttons to select parking durations and carry out payments 160, a printer, or a combination thereof. The base 120 comprises slots for accepting bills or coins 150.

Figure 3:
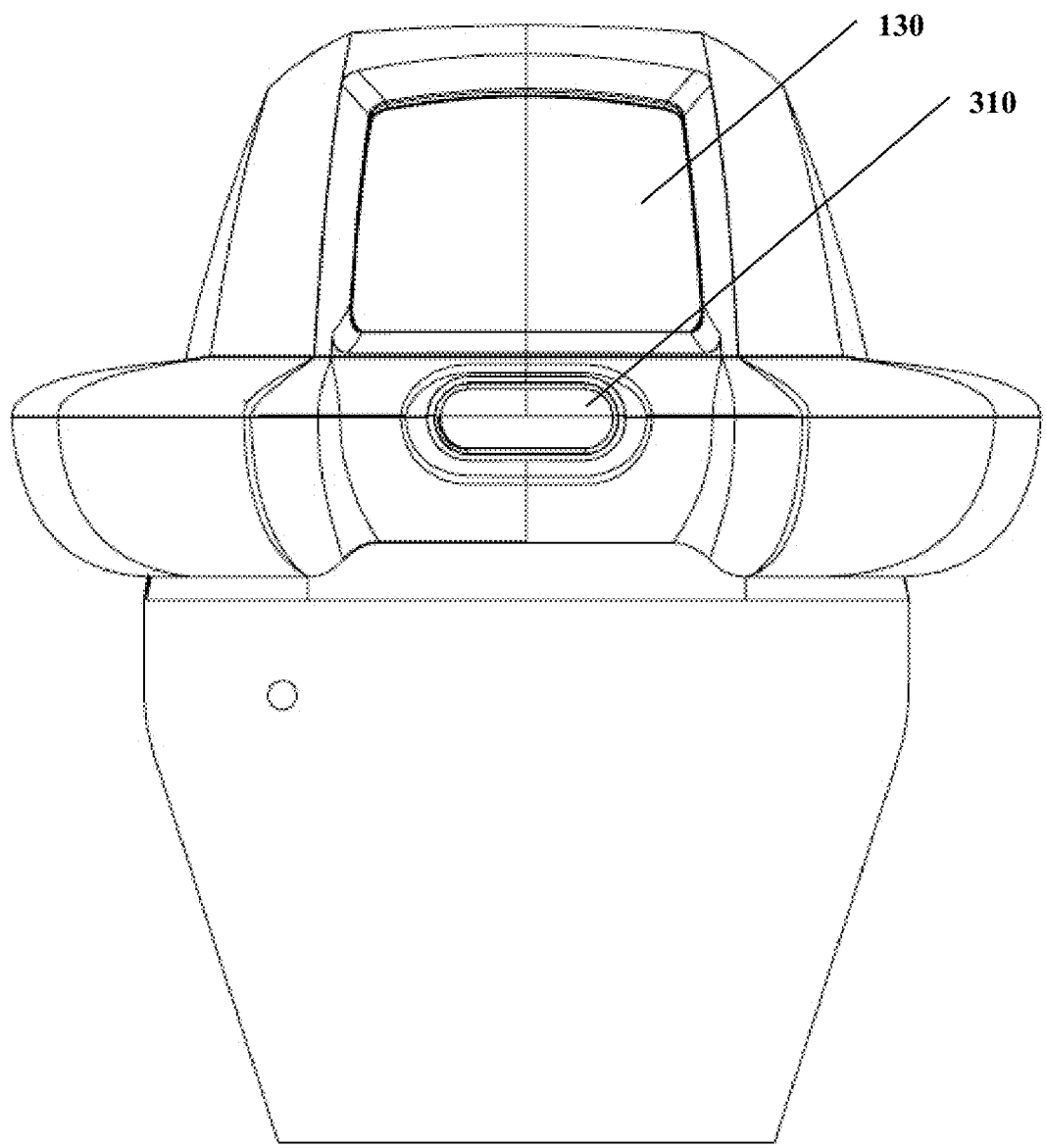
FIG. 3 shows a non-limiting example of an upgraded meter described herein; in this case, a rear view of an exemplary meter.
Figure 4:
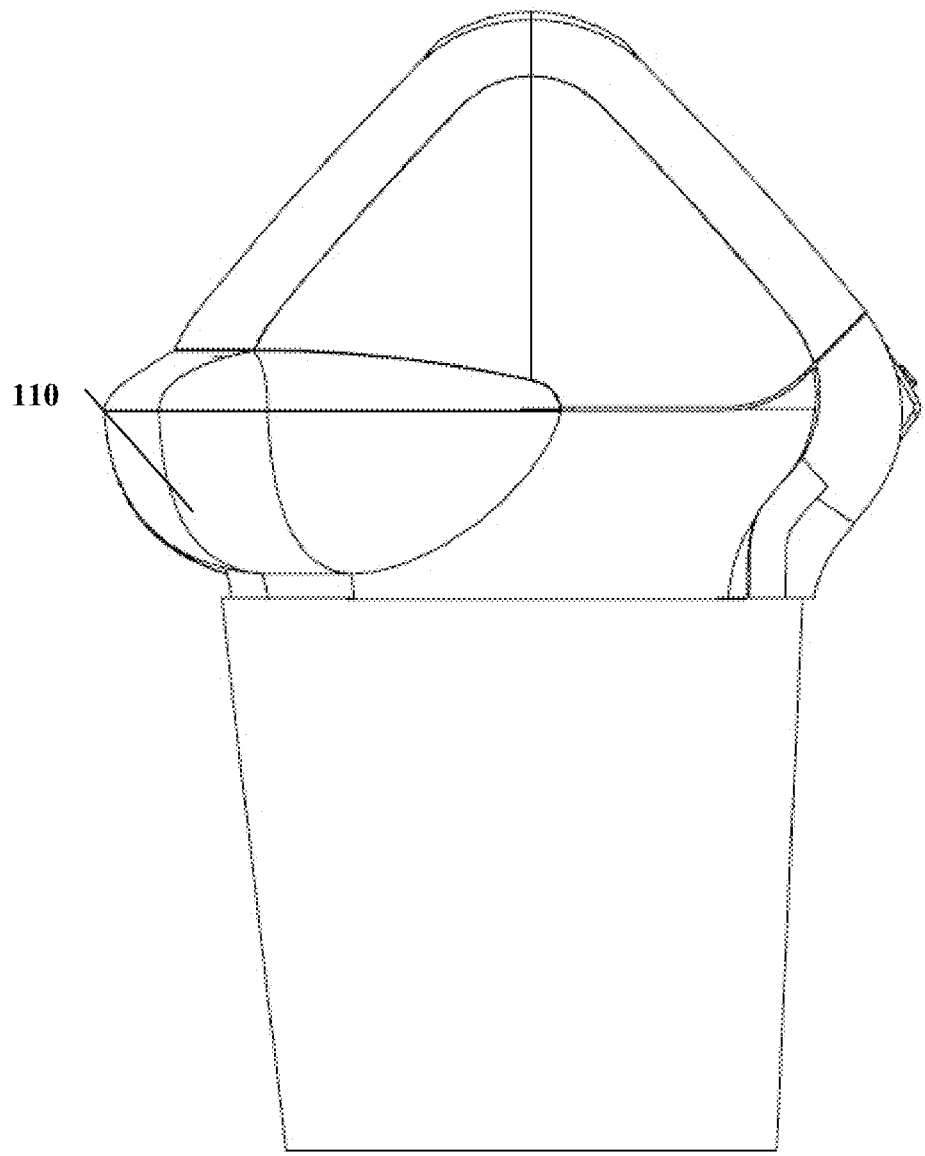
FIG. 4 shows a non-limiting example of an upgraded meter described herein; in this case, a side view of an exemplary meter.
Figure 5:
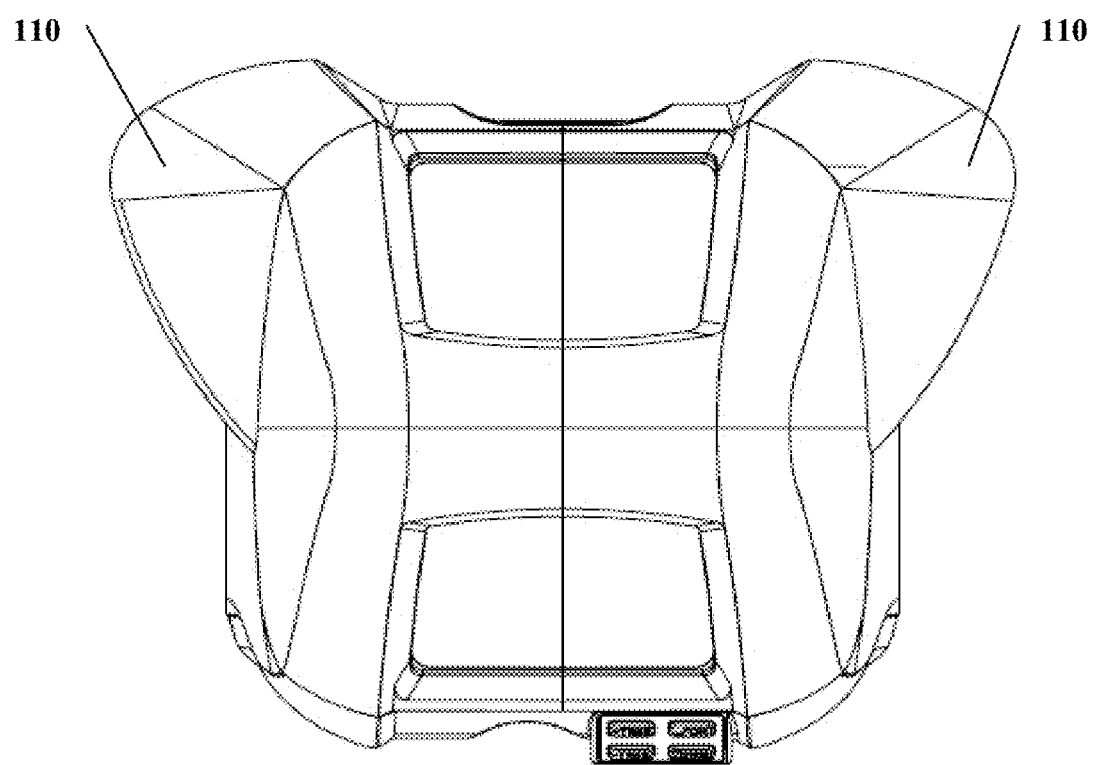
FIG. 5 shows a non-limiting example of an upgraded meter described herein; in this case, a top view of an exemplary meter.

Referring to FIG. 3, in a particular embodiment, the rear view of a meter comprises a display screen 130 and an environmental sensor unit 310.

Figure 6:
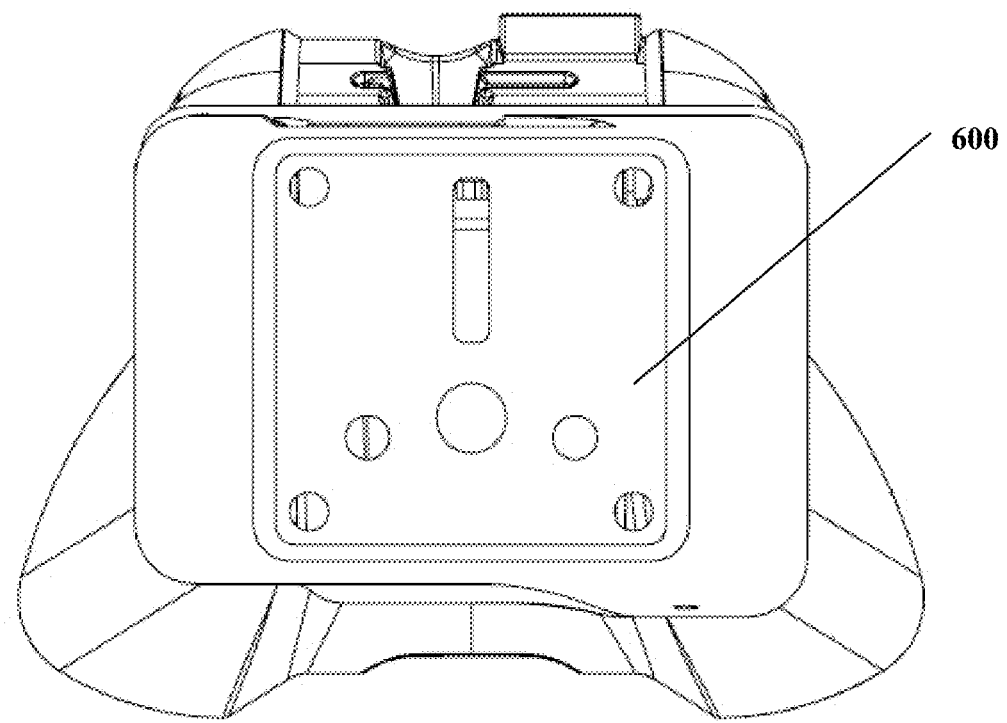
FIG. 6 shows a non-limiting example of an upgraded meter described herein; in this case, a bottom view of an exemplary meter.

Referring to FIG. 6, in a particular embodiment, the bottom view of a meter comprises a mounting base 600 configured to engage and lock into a variety of different meter poles.

Sensors

In certain embodiments, the cover housing includes one or more sensors. In some embodiments, the sensor is an environmental sensor. In various embodiments, the cover housing suitably includes 1, 2, 3, 4, 5, 6, 7, 8, 9, 10 or more environmental sensors. In some embodiments, a suitable environmental sensor is any sensor that is capable of emitting a signal and detecting the signal when it is reflected back from the surface of a vehicle that moves into a single parking spot or multiple parking spots situated to the left and right of the parking meter. Examples of suitable environmental sensors include, by way of non-limiting examples, radar, low power/broad spectrum radar, time of flight sensors, ranging sensors, magnetic sensors, magnetic-flux sensors, non-intrusive sensors, capacitance sensors, proximity sensors, ultrasonic sensors, infrared sensors, microwave sensors, and the like. In other embodiments, the environmental sensor is a mass sensor, e.g., a magnetometer. In a particular embodiment, the sensor is a vehicle sensor.

In some embodiments, a suitable environmental sensor is any sensor that is capable of making a qualitative assessment or a quantitative measurement of a physical or chemical aspect of the area immediately surrounding the meter. Examples of suitable environmental sensors include, by way of non-limiting examples, those that detect or measure atmospheric pressure, humidity, wind speed, wind direction, precipitation, flooding, seismic activity, light, UV index, and/or temperature.

Further examples of suitable environmental sensors include, by way of non-limiting examples, those that detect or measure air particulates, air pollution, and/or water pollution. In various embodiments, suitable air pollution sensors include those that detect or measure pathogens, sulfur oxides ($SO_X$), nitrogen oxides ($NO_X$), greenhouse gases, carbon monoxide (CO), carbon dioxide ($CO_2$), methane, volatile organic compounds (VOCs), toxic metals (such as lead and mercury), chlorofluorocarbons (CFCs), ammonia ($NH_3$), ground level ozone ($O_3$), and/or peroxyacetyl nitrate (PAN). In various embodiments, suitable water pollution sensors include those that detect or measure detergents, insecticides, pathogens, hydrocarbons, VOCs, chlorinated solvents, perchlorate, fertilizers, and heavy metals.

Further examples of suitable environmental sensors include, by way of non-limiting examples, those that detect or measure chemical agents, biological agents, natural gas, radiation, and/or electromagnetic energy. In a particular embodiment, at least one sensor is a camera. In further particular embodiments, a camera images one or more parking spaces associated with the meter. X Further examples of suitable environmental sensors include, by way of non-limiting examples, those that detect or measure sound.

In some embodiments, sensors in meter cover housings are installed on a plurality of meters throughout a municipality. In further embodiments, the sensor-enabled meters have communication capability and form a sensor network by transmitting environmental information from a range of territory within the municipality to a central management server. By forming a sensor network, the upgraded meters allow officials of the municipality to monitor the environment on an ongoing basis or in an emergency. By way of example, a sensor network is optionally used to monitor point sources of air pollution within the municipality on a continual basis. By way of further example, a sensor network is optionally used to monitor spread of radiation within the municipality during an act of war or terrorism. By way of further example, a sensor network is optionally used to determine the location of gunshots fired within a municipality. By way of further example, a sensor network is optionally used to monitor flooding within the municipality in an extreme weather event.

In certain embodiments, an environmental sensor is housed within the right or left flare 110 on the read side of the cover housing. In certain embodiments, the sensor is mounted on a pivoted support that allows the rotation of an object about a single axis, e.g., a gimbal. The sensor, mounted on a gimbal 900, is able to tilt relative to an axis that is perpendicular to the solar panel side and the user interface side of the cover housing. This feature facilitates the positioning of the sensor in multiple angles, depending on the relative position of the parking meter and the one or more parking spots that the meter is intended to monitor.

Figure 9A:
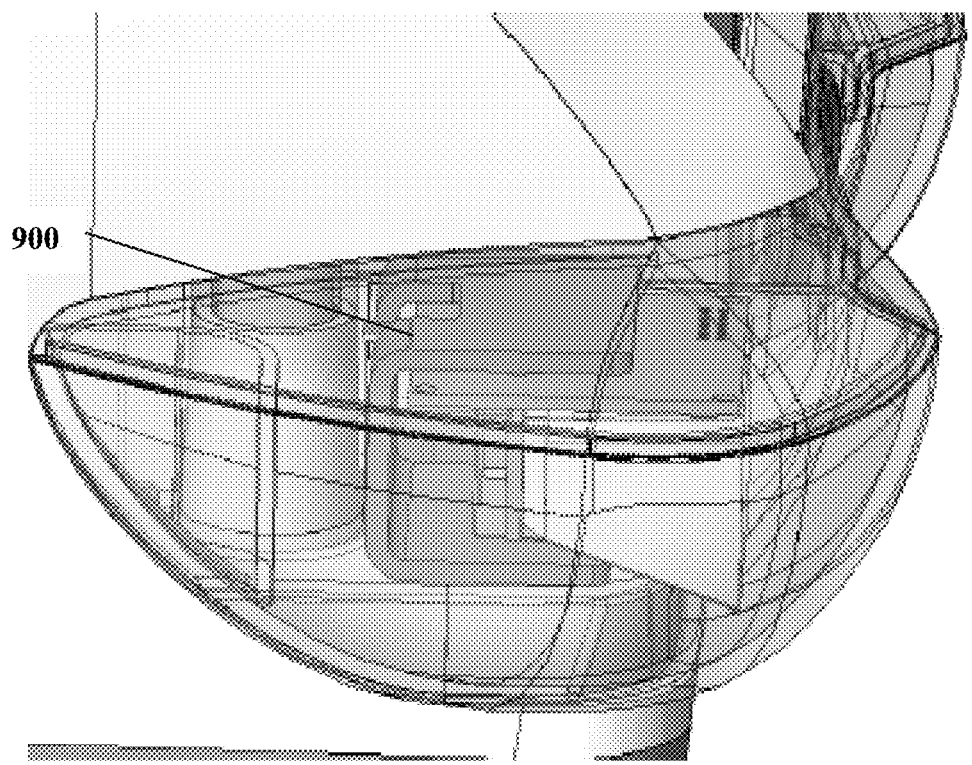
FIGS. 9A and 9B show a non-limiting example of the interior of a cover housing of an upgraded meter containing right and left flares described herein; in this case (FIG. 9A) a side view of the interior of the right flare of the exemplary meter, wherein the right flare houses a radar, (FIG. 9B) a top view of the interior of the exemplary meter, wherein the right flare houses a radar and the radar is not tilted relative to an axis that is perpendicular to the solar panel side and the user interface side of the meter.
Figure 9B:
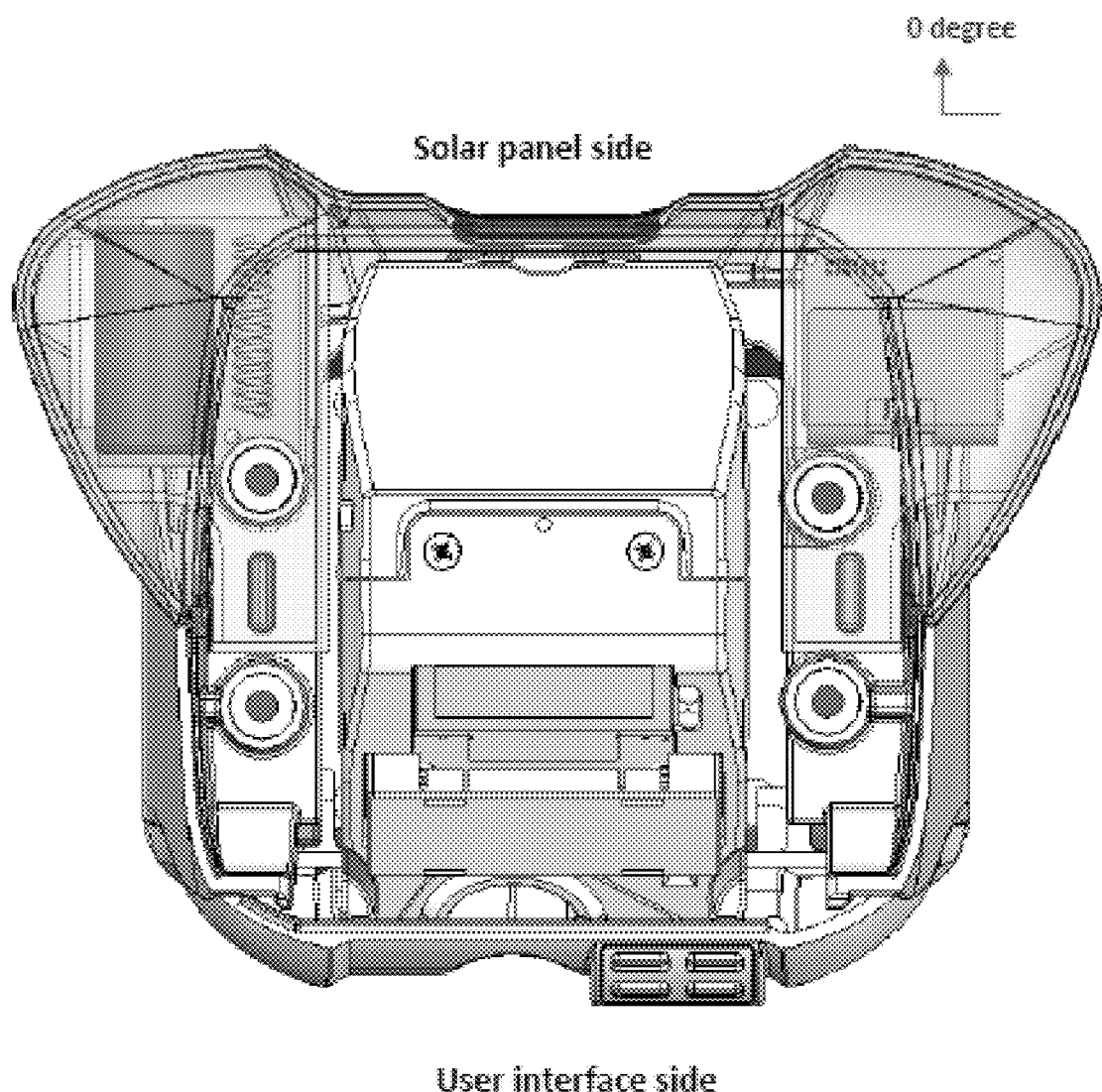

Referring to FIGS. 9A and 9B, in a particular embodiment, the interior of an upgraded meter comprises a radar 900, wherein the radar is adjustable horizontally (angle) and vertically (tilt). In other embodiments, the radar 900 is optionally installed in the left flare, the right flare, or both flares. In various embodiments, the radar 900 is mounted on a gimbal. In this embodiment, the right flare houses a radar 900 and the radar 900 is not tilted relative to an axis that is perpendicular to the solar panel side and the user interface side of the meter.

Figure 10A:
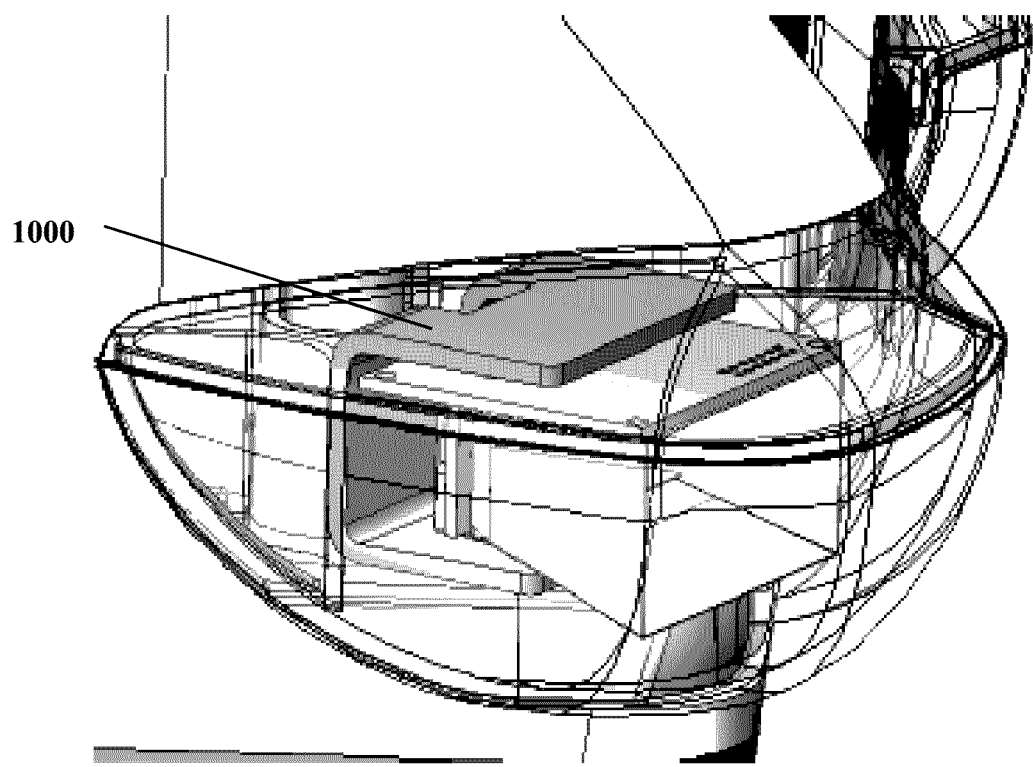
FIGS. 10A and 10B show a non-limiting example of the interior of a cover housing of an upgraded meter containing right and left flares as described herein; in this case (FIG. 10A) a side view of the interior of the right flare of the exemplary meter, wherein the right flare houses a radar, (FIG. 10B) a top view of the interior of the exemplary meter, wherein the right flare houses a radar and the radar is tilted at an angle of 30° to the right of an axis that is perpendicular to the solar panel side and the user interface side of the meter.
Figure 10B:
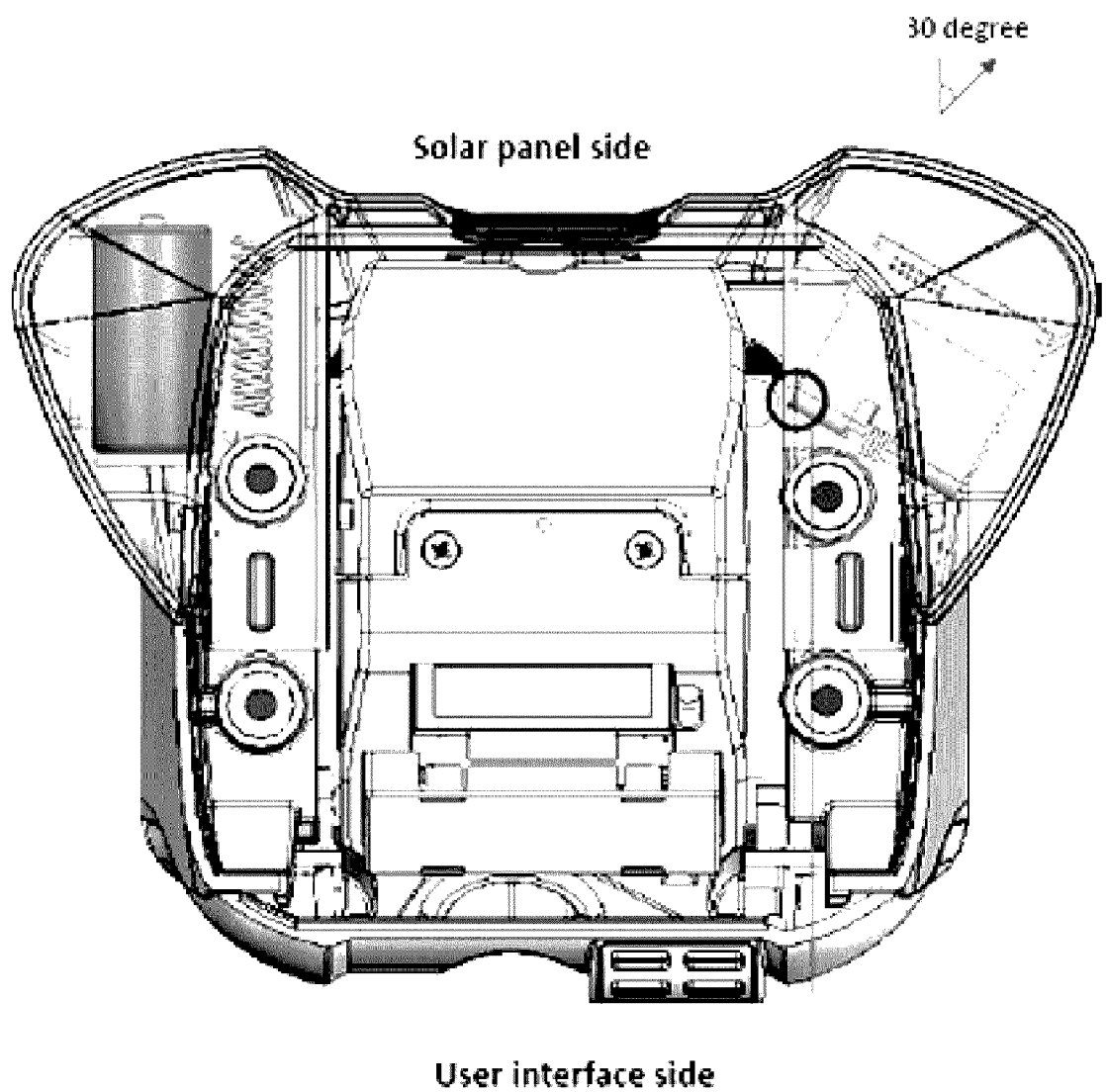

Referring to FIGS. 10A and 10B, in a particular embodiment, the interior of an upgraded meter comprises a radar 1000, wherein the radar is adjustable horizontally (angle) and vertically (tilt). In other embodiments, the radar 1000 is optionally installed in the left flare, the right flare, or both flares. In various embodiments, the radar 1000 is mounted on a gimbal. In this embodiment, the right flare houses a radar 1000 and the radar 1000 is tilted at an angle of 30° to the right of an axis that is perpendicular to the solar panel side and the user interface side of the meter.

Figure 11A:
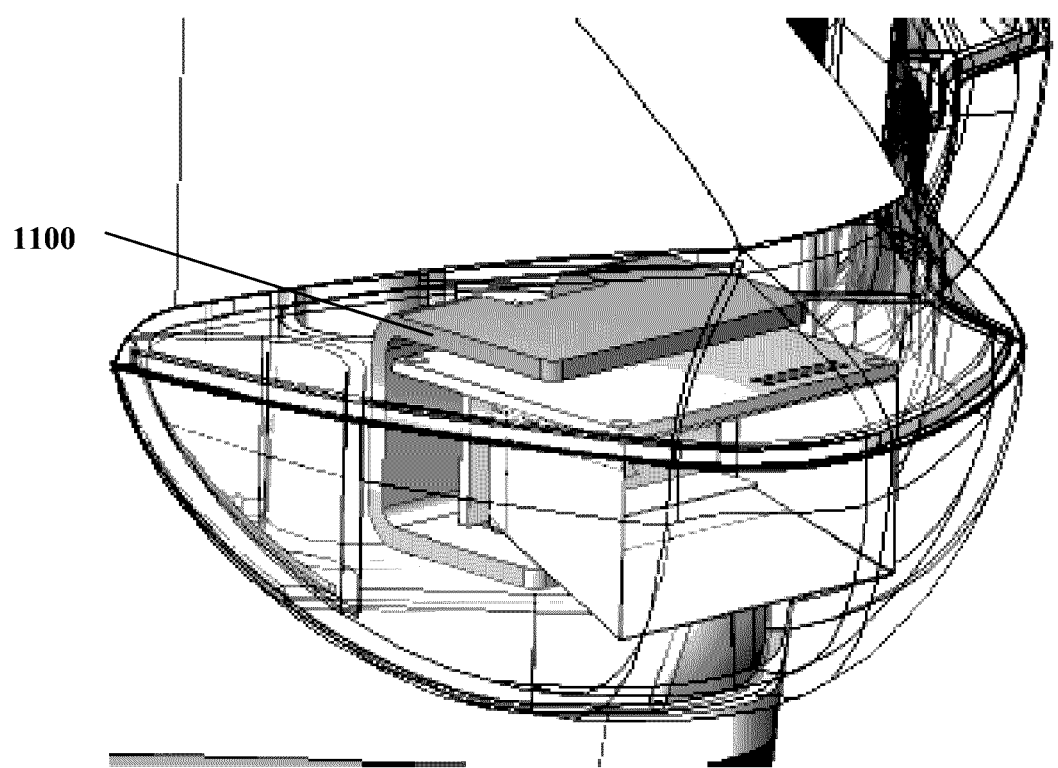
FIGS. 11A and 11B show a non-limiting example of the interior of a cover housing of an upgraded meter containing right and left flares described herein; in this case (FIG. 11A) a side view of the interior of the right flare of the exemplary meter, wherein the right flare houses a radar, (FIG. 11B) a top view of the interior of the exemplary meter, wherein the right flare houses a radar and the radar is tilted at an angle of 45° to the right of an axis that is perpendicular to the solar panel side and the user interface side of the meter.
Figure 11B:
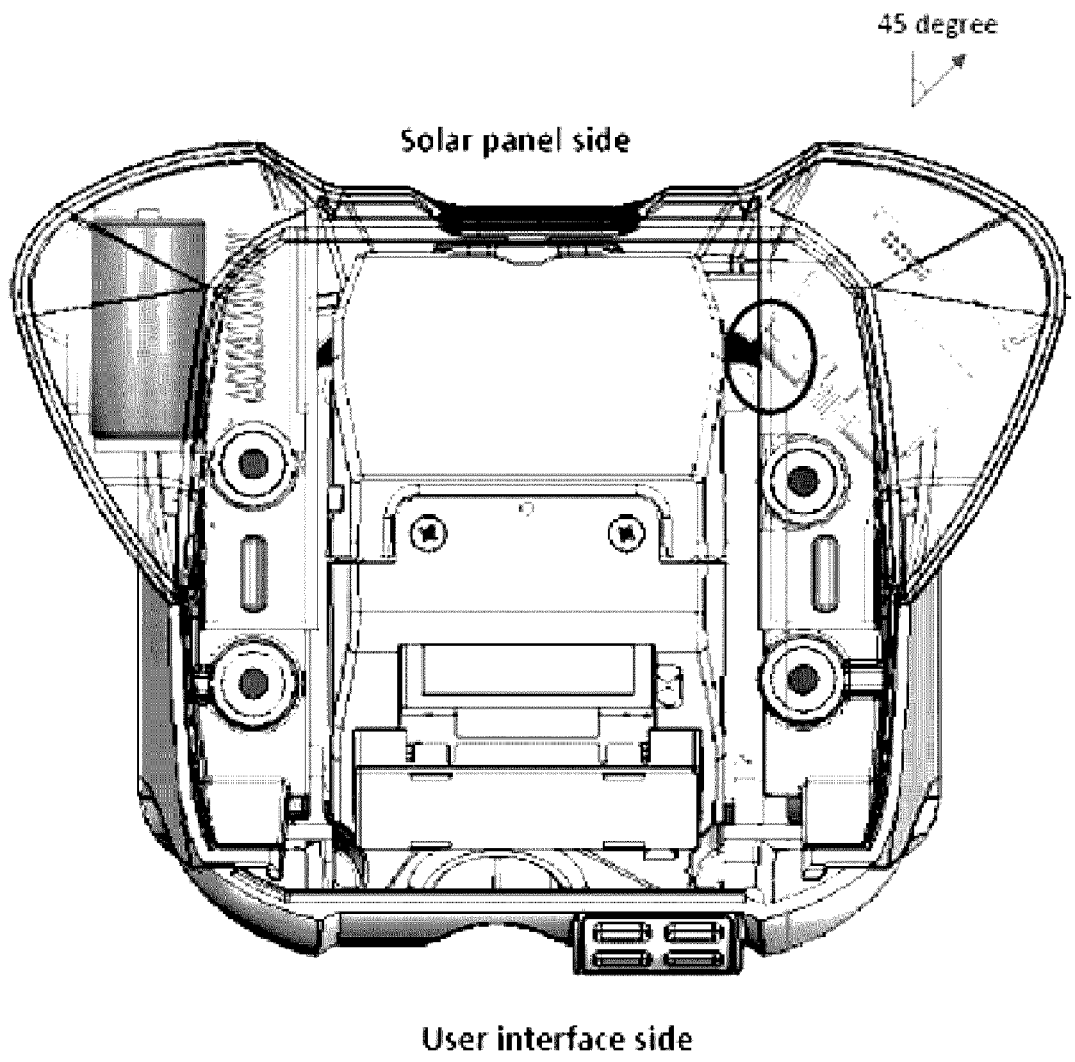

Referring to FIGS. 11A and 11B, in a particular embodiment, the interior of an upgraded meter comprises a radar 1100, wherein the radar is adjustable horizontally (angle) and vertically (tilt). In other embodiments, the radar 1100 is optionally installed in the left flare, the right flare, or both flares. In various embodiments, the radar 1100 is mounted on a gimbal. In this embodiment, the right flare houses a radar 1100 and the radar 1100 is tilted at an angle of 45° to the right of an axis that is perpendicular to the solar panel side and the user interface side of the meter.

Figure 12A:
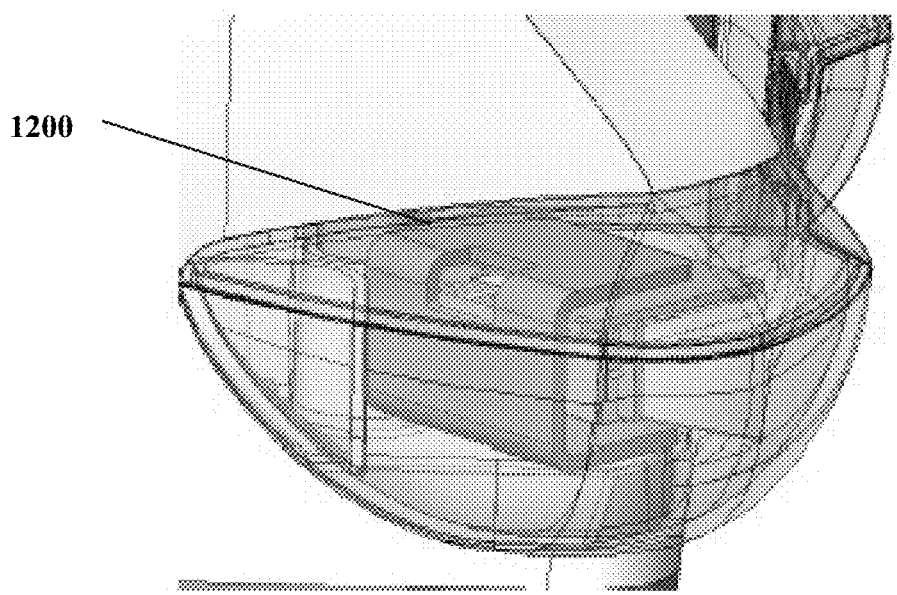
FIGS. 12A and 12B shows a non-limiting example of the interior of a cover housing of an upgraded meter containing right and left flares as described herein; in this case (FIG. 12A) a side view of the interior of the right flare of the exemplary meter, wherein the right flare houses a radar, (FIG. 12B) a top view of the interior of the exemplary meter, wherein the right flare houses a radar and the radar is tilted at an angle of 45° to the left of an axis that is perpendicular to the solar panel side and the user interface side of the meter.
Figure 12B:
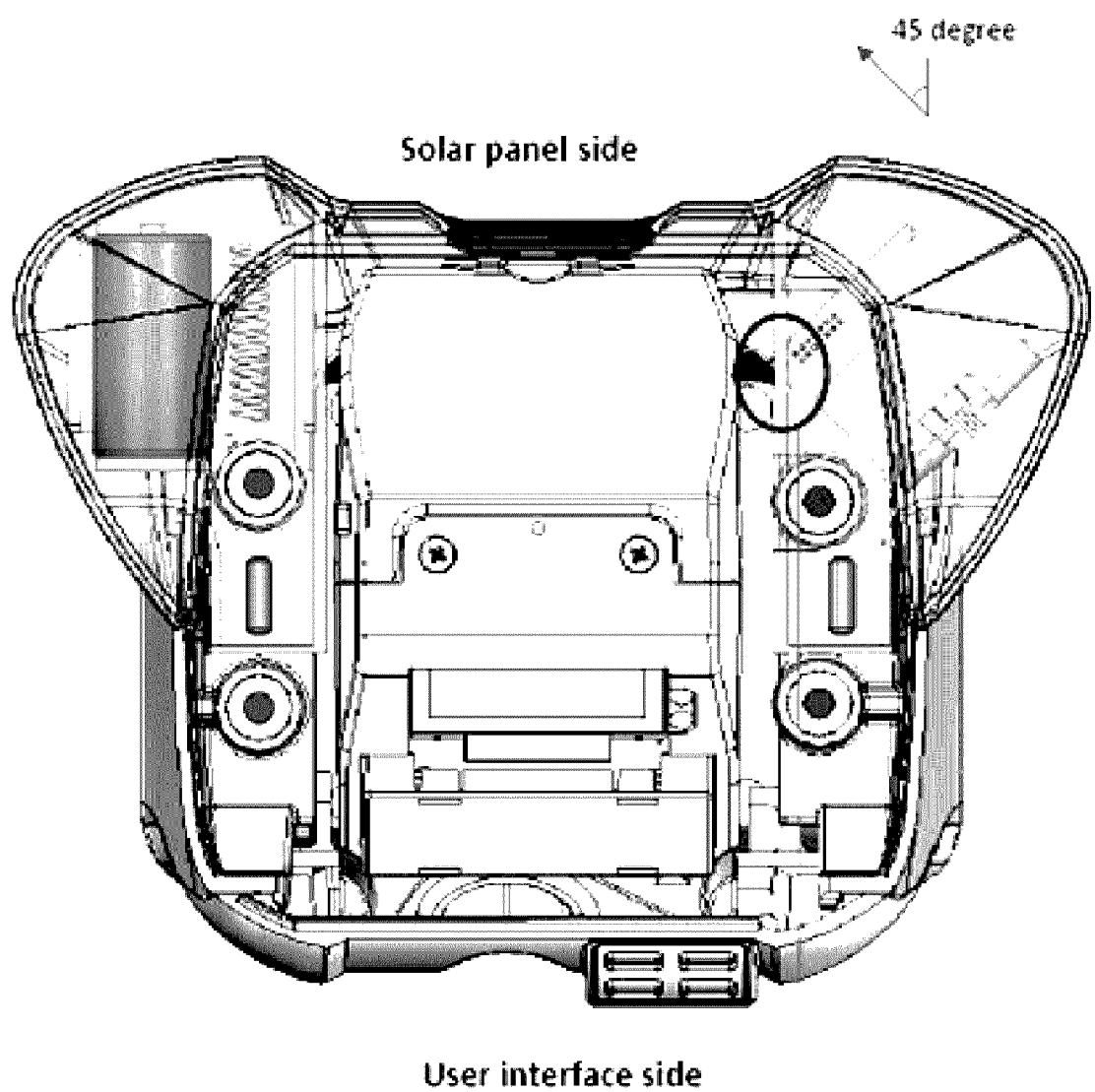

Referring to FIGS. 12A and 12B, in a particular embodiment, the interior of an upgraded meter comprises a radar 1200, wherein the radar is adjustable horizontally (angle) and vertically (tilt). In other embodiments, the radar 1200 is optionally installed in the left flare, the right flare, or both flares. In various embodiments, the radar 1200 is mounted on a gimbal. In this embodiment, the right flare houses a radar 1200 and the radar 1200 is tilted at an angle of 45° to the left of an axis that is perpendicular to the solar panel side and the user interface side of the meter.

Wireless Radio

In some embodiments, the cover housing does not include a wireless radio transmitter/receiver, but rather communicates (via wired or wireless connection) with the meter device, which does include a wireless radio transmitter/receiver. In such embodiments, the cover housing utilizes the wireless radio of the primary meter device for longer-range communication.

In some embodiments, the cover housing includes a wireless radio transmitter/receiver. The wireless radio can be any equipment known in the art that is capable of receiving and/or transmitting radio waves, using any methods. For example, the wireless radio transmitter and receiver can be any equipment that can transmit and receive radio waves in any known fashion using any known data protocol, many of which are well known in the art, without departing from the scope of this invention.

The wireless radio transmitter suitably utilizes ISM band, Wi-Fi, Bluetooth, ZigBee, iBeacon, cellular (e.g., GSM, GPRS, EDGE, 2G, 2.5G, 3G, 4G, 5G, etc.), IEEE 802.15, WiMAX, or the like, to transmit information. The wireless radio transmitter is optionally used to communicate information collected from, for example, one or more sensors, the meter mechanism, or one or more RFID tags, to a remote server. The wireless radio transmitter is also optionally used to communicate internal information such as maintenance and error reporting messages, to one or more remote servers or a cloud computing system. The wireless radio transmitter is optionally used to communicate information to the meter mechanism, to one or more RFID tags (including memory) associated with the meter, to one or more remote servers, to a cloud computing system, to one or more parking enforcement officers, and/or to a meter maintenance technician.

In some embodiments, the wireless radio communicates to the meter or a remote server by relaying information through another object. For example, the object is, by way of non-limiting examples, another meter device, a vehicle, a consumer device, a mobile phone, a smartwatch, a camera, a computer, a laptop, an electronic notepad, or a PDA. In various embodiments, the wireless radio communicates directly to a database, a user, an enforcement officer, or a maintenance technician.

RF Tag-Based Configuration and Binding

In some embodiments, an RFID reader is affixed to the cover housing. In some embodiments, the electronic components of the cover housing obtain configuration information by reading an RFID tag associated with the meter to obtain a unique ID, which is associated with a unique physical location in a remote database.

In some embodiments, the cover housing, including an RFID reader, will read an RFID tag associated with the meter to obtain a unique ID and use the ID to determine if the meter location is configured in the database to have a sensor. In further embodiments, if the meter location is configured in the database to have a sensor, the cover housing downloads from a remote management system configuration information. This enables the cover housing and sensor to be changed and update automatically to communicate wirelessly with the meter in place.

In other embodiments, the cover housing does not include an RFID reader, but rather the electronic components of the cover housing communicate via wired or wireless connection to the meter device which does include an RFID reader. In such embodiments, the RFID reader of the meter device reads an RFID tag associated with the meter to obtain a unique ID, which is associated with a unique physical location in a remote database, and passes that information on to the cover housing.

In further embodiments, the meter device, including an RFID reader, will read an RFID tag associated with the meter to obtain a unique ID and use the ID to determine if the meter location is configured in the database to have a sensor. In further embodiments, if the meter location is configured in the database to have a sensor, the meter device downloads from a remote management system a binding code enabling the meter to wirelessly connect to, and wirelessly communicate with that sensor. This enables the meter mechanism to be changed and update automatically to communicate wirelessly with the sensor in place.

In some embodiments, sensor configurable parameters, testing, and feedback information are optionally displayed on the meter display or on a wireless handheld device of a user (smart phone, smart watch, etc.). The parameters, testing, and feedback information is useful used during initial setup and diagnostics. In fact, when the sensor detects a vehicle, in some embodiments, the sensor triggers an icon or other visual indicator to appear on the meter display in order to confirm that it is detecting properly.

Power Unit

In some embodiments, one or more power units are affixed to the cover housing. The power unit can be any device that is capable of supplying power for operating the electronic components of the cover housing. Suitable power units include rechargeable or non-rechargeable batteries, capacitors, ultracapacitors, and the like, including combinations thereof. In various embodiments, suitable batteries include primary batteries, secondary batteries, wet cell batteries, dry cell batteries, reserve batteries, including combinations thereof. In further various embodiments, suitable batteries include, lithium, Li-ion rechargeable, alkaline, carbon-zinc, Li—$FeS_2$, NiMH, NiCd, NiOOH, including combinations thereof.

In some embodiments, the one or more sensors are powered solely by batteries.

In various embodiments, one or more power units are configured to enter power saving mode, wherein the one or more power units discharge less power and the meter disables some electronic components after a preset idle time.

In other embodiments, the cover housing includes one or more solar panels configured to charge one or more rechargeable batteries.

Methods for Meter Upgrades Using Cover Housing

Described herein, in certain embodiments, are methods of upgrading a meter comprising: disengaging a cover housing from the housing base of an existing meter to expose an internal meter device; removing the cover housing; replacing the cover housing; and engaging the replacement cover housing with the housing base to cover and enclose the meter device; provided that the replacement cover housing comprises: a sensor affixed to the cover housing, the sensor configured to collect environmental information pertaining to the local external environment of the meter; a wireless radio affixed to the cover housing, the wireless radio configured to transmit the environmental information to the meter device or to one or more remote servers in communication with the meter device; and a power unit affixed to the cover housing, the power unit supplying power to the sensor and the wireless radio; whereby the meter is upgraded.

Described herein, in certain embodiments, are methods of upgrading a meter comprising: disengaging a portion of a cover housing from a cover housing of an existing meter; removing the portion of the cover housing; replacing the portion of the cover housing; and engaging a replacement portion of the cover housing with the cover housing of the existing meter; provided that an internal meter device of the existing meter is not replaced; provided that the portion of the cover housing comprises less than 75%, 50%, or 25% of the cover housing; provided that the replacement portion of the cover housing comprises: a sensor affixed to the portion of the cover housing, the sensor configured to collect environmental information pertaining to the local external environment of the meter; a wireless radio affixed to the portion of the cover housing, the wireless radio configured to transmit the environmental information to the meter device or to one or more remote servers in communication with the meter device; and a power unit affixed to the portion of the cover housing, the power unit supplying power to the sensor and the wireless radio; whereby the meter is upgraded.

The meter upgrade methods described herein generate minimal waste, reduce material and labor costs, and can be complete more quickly than current methods. Importantly, the meter upgrade methods described herein allow efficient secondary upgrades. In other words, the methods, in some embodiments, contemplate an upgrade to meter that was previously upgraded by retrofit of a new meter mechanism (e.g., replacement of the electronic mechanism within the base housing, with or without replacement of the cover housing).

Figure 7A:
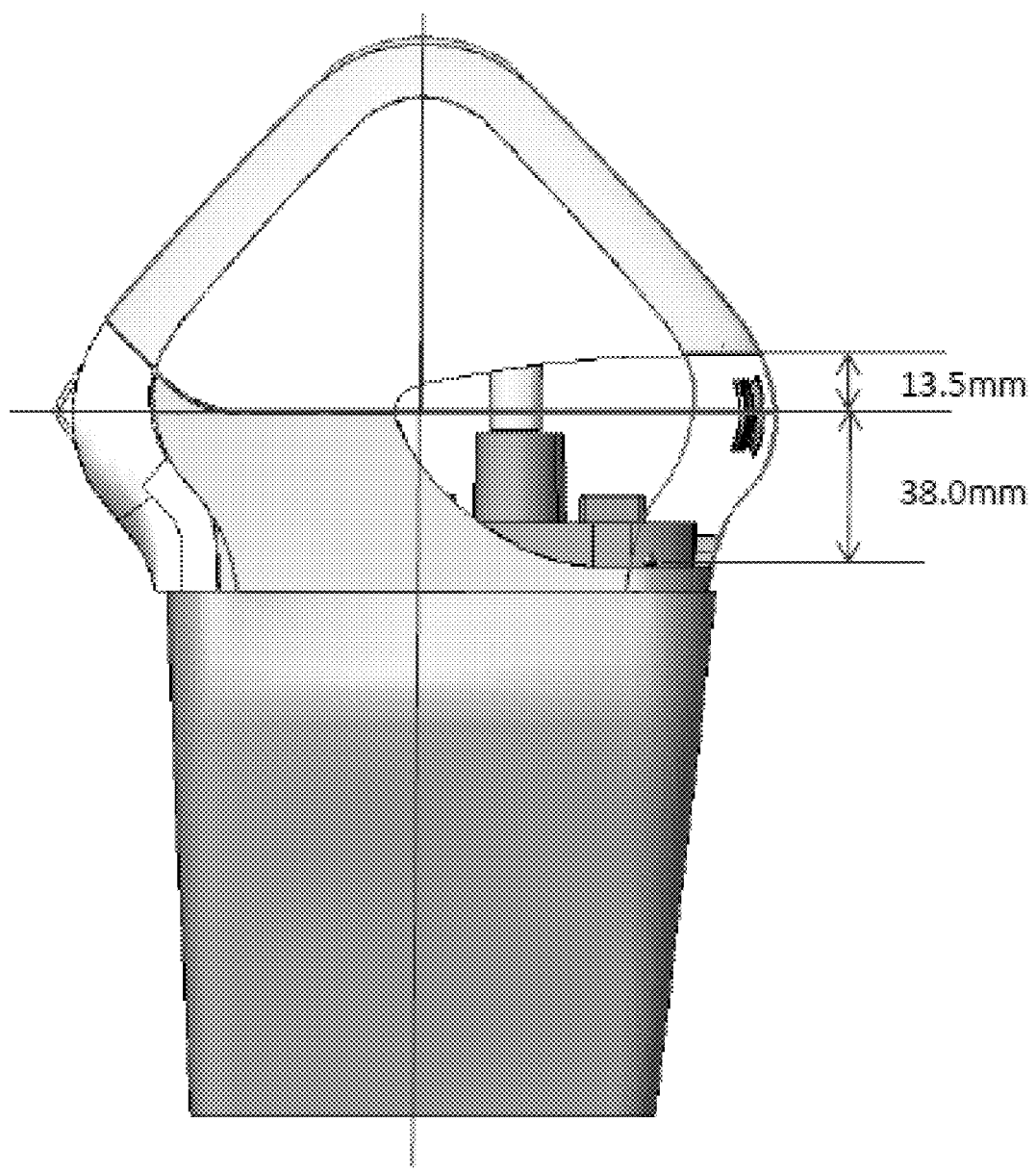
FIGS. 7A and 7B shows a non-limiting example of a cover housing of an upgraded meter described herein; in this case (FIG. 7A) a side view of an exemplary meter, wherein a flare is removed from the solar panel side of the meter (FIG. 7B) a rear view of an exemplary meter, wherein the right and left flares are removed from the solar panel side of the meter.
Figure 7B:
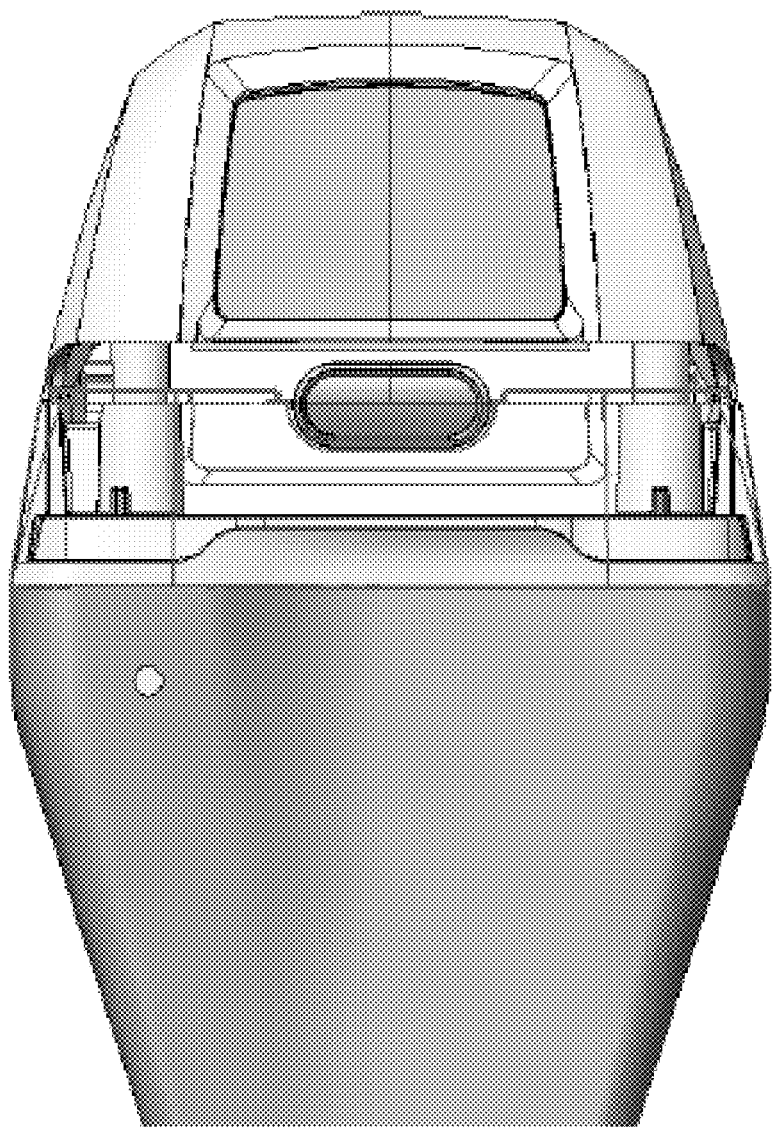

Referring to FIGS. 7A and 7B, in a particular embodiment, the left and right flares 110 are removed from the meter. In this embodiment, this is the meter before upgrade.

Figure 8A:
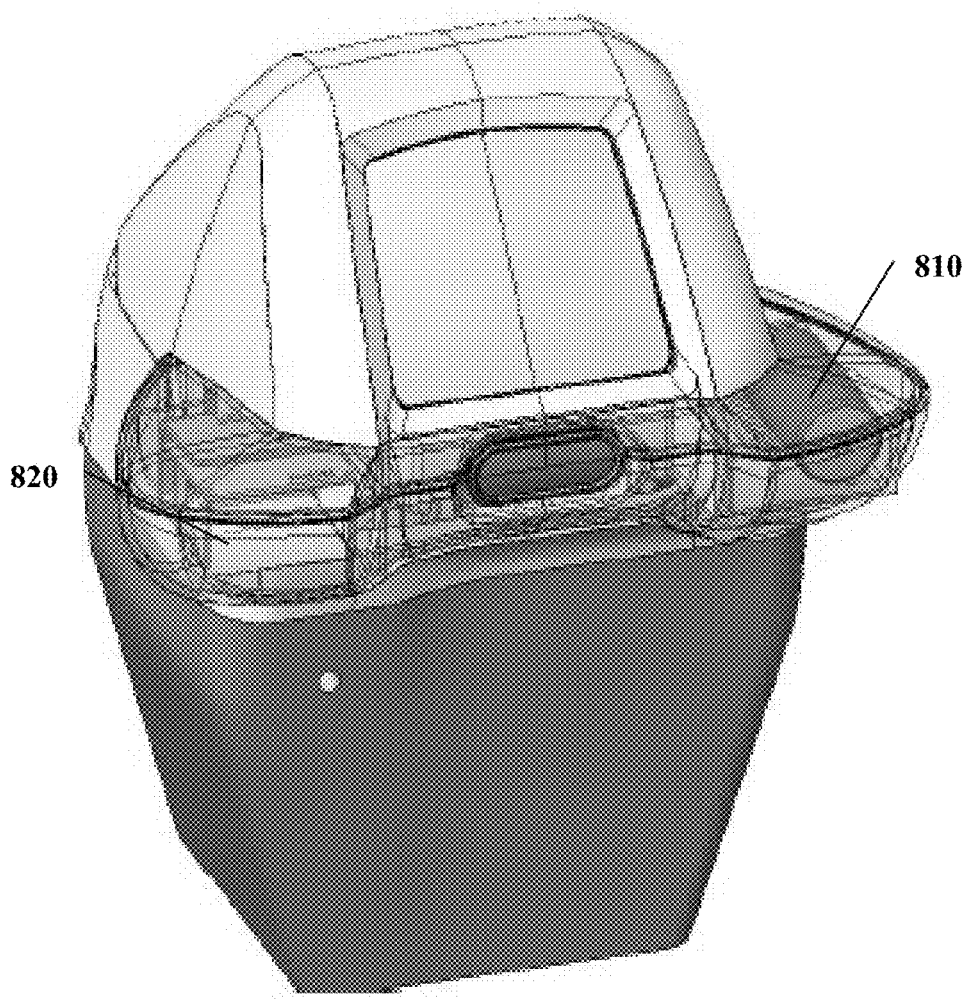
FIGS. 8A and 8B show a non-limiting example of a cover housing of an upgraded meter containing right and left flares described herein; in this case (FIG. 8A) a rear view of an exemplary meter, wherein the right flare houses a radar, and the left flare houses a C-cell battery and an antennae (FIG. 8B) a top view of an exemplary meter, wherein the right flare houses a radar, and the, and the left flare houses a C-cell battery and an antennae.
Figure 8B:
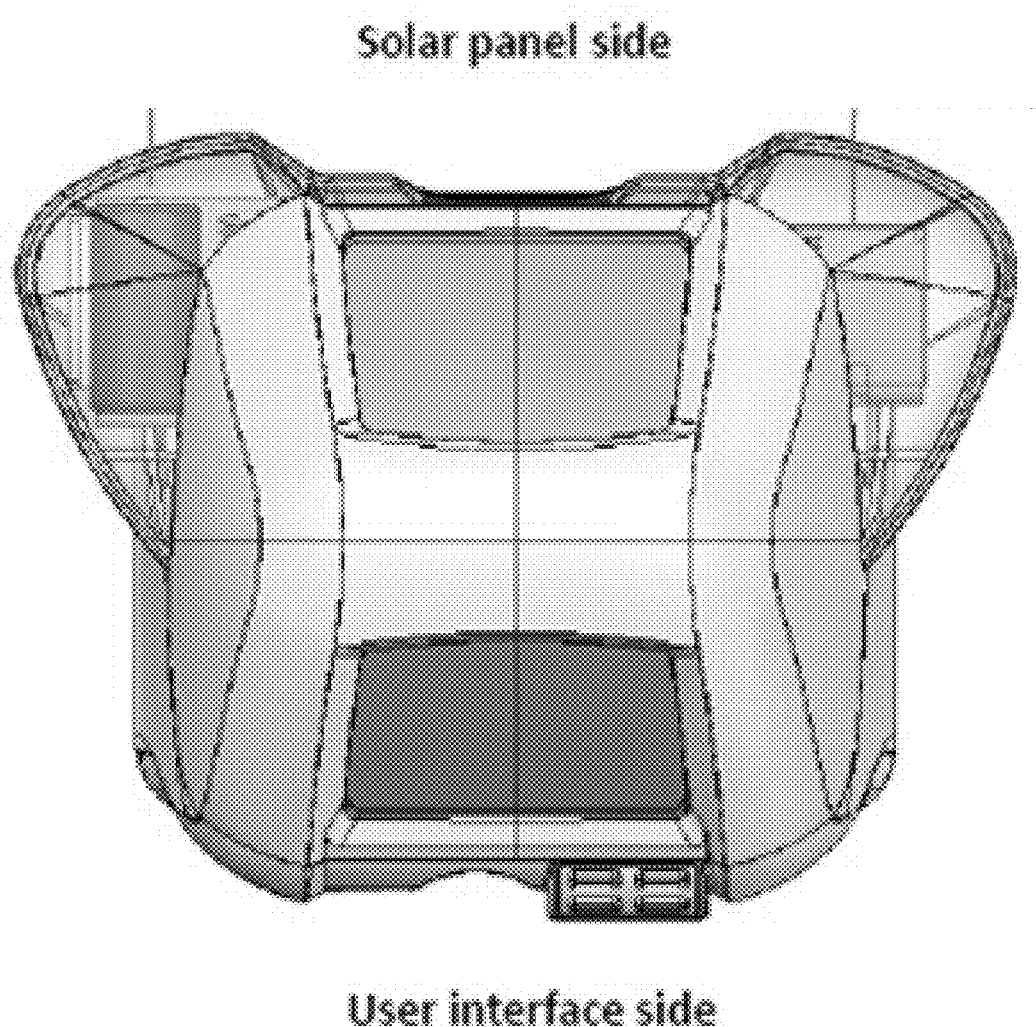

Referring to FIGS. 8A and 8B, in a particular embodiment, an environmental sensor 820 is housed in left flare, and a battery 810 is held in the right flare. In this embodiment, this is the meter after upgrade and could be interpreted to depict a partial cover replacement.

Applications Enabled by Upgraded Cover Housings

The meters upgraded with cover housings in accordance with the present invention are optionally used for multiple applications, as described herein.

In certain embodiments, the cover housings described herein comprise a payment accepting unit which is positioned in the user interface side of the cover housing. In further embodiments, a meter retrofitted with the cover housing can accept payment, in various forms, e.g., Credit Cards, Debit Cards, Smart Parking Cards, Proximity Cards (Paywave™, PaypassCash™), NFC Solutions such as Google Wallet™, bills, or coins, via the payment accepting unit of the cover housing. In particular embodiments, the cover housings described herein comprise a wireless payment accepting unit which is positioned in the user interface side of the cover housing. In further embodiments, the wireless payment accepting unit enables a meter retrofitted with the cover housing to accept payment via Proximity Cards (Paywave™, PaypassCash™) or NFC Solutions such as Google Wallet™. In still further embodiments, a sensor affixed to the cover housing of the parking meter detects the arrival of a user at the user interface side of the cover housing or the arrival of a vehicle in a parking space associated with the meter and communicates the event to the meter unit. In some embodiments, this event information is used to power-up the payment accepting unit (which had been powered-down to conserve energy), activate the payment accepting unit, or allow the payment accepting unit to anticipate or prepare for acceptance of payment.

In certain embodiments, the power unit affixed to the cover housing can be in an off-mode in the absence of any vehicle movement in the parking spots to the left or right of the meter. The power unit can be turned on, only upon detection, by the sensor affixed to the meter cover, of vehicle movement in the parking spots to the left or right of the meter. This results in reduction of energy costs associated with operating the meter. In certain embodiments, the meters rapidly switch on upon detection of vehicle movement, by the sensors, and are ready for carrying out payment transactions, through the user interface side, even before the vehicle driver walks up to the meter.

In some embodiments, the sensor affixed to the cover housing of the parking meter, communicates the information regarding the departure of the vehicle to the meter and this results in immediate resetting of paid time. In further embodiments, the sensor affixed to the cover housing of the parking meter, communicates through wireless radio, which in turn transmits the information to the wireless tag affixed to the parking meter, and this results in the update of the display screen. Thus, the parking meters describe herein is optionally used to avoid overlap of paid time between successive vehicles occupying the same parking spot. This enables collection of increased and accurate revenue from the parking meters of the present invention.

In certain embodiments, the vehicle movement information, within the parking spots to the left and right of the parking meter, can be collected by the sensor and transmitted, via the wireless radio transmitter (along with location identification information stored in an RF tag associated with the parking meter), to one or more remote servers, a cluster of servers, or cloud computing system. The types of information transmitted to the server can include, for example, average length of time during which the parking spots are occupied and paid for, average length of time during which the parking spots are unoccupied and not paid for, days of the week with maximum occupancy and/or vehicle movement in the parking spots, or times of the day with maximum occupancy and/or vehicle movement in the parking spots. The information stored at the server is optionally utilized to model the vehicle flux trends within the local environment of the parking meter, and fix parking rates and/or time limits for parking to precisely meet the needs of the local environment.

EXAMPLES

The following illustrative examples are representative of embodiments of the software applications, systems, and methods described herein and are not meant to be limiting in any way.

Example 1

Installing the Cover Housing

A city maintenance technician performs his duties, which include driving around town upgrading parking meters. He loads his vehicle with upgraded cover housings and a toolbox. When he approaches an outdated meter, he does not need to perform any major upgrades to infrastructure, such as drilling, underground wiring, road work, and the like. As such, he does not have need of any advanced or heavy tools, such as an industrial hammer drill. Instead, the technician uses his simple tools, for instance a screwdriver and a wrench, to disengage and remove the old cover housing from the meter. He then, using the same tools for removing the old housing, replaces and engages the new upgraded cover housing. The entire process for replacing the cover housing requires less than 10 minutes for completion. The technician returns the old cover housings to the manufacturer, whereby the cover housings are upgraded to incorporate new features.

Example 2

Installing Only a Portion of the Cover Housing

Technician from Example 1 is performing the same duties, except this time he is only replacing a portion of the cover housing. The portion of the cover housing contains upgraded parts beyond those provided in the upgraded cover housing detailed in Example 1, including upgraded sensors, an RFID tag reader, a self-contained power supply, and a dedicated wireless radio. The self-sufficient portion of the cover housing is installed onto pre-upgraded cover housings. The technician, using the same simple tools, such as a screwdriver and a wrench, disengages and removes a portion of the upgraded cover housing and then replaces and engages the upgraded portion of the cover housing, thereby completing an upgrade of an upgrade. The technician does not need to remove the entire cover housing to complete the upgrade, and thereby he does not need to tamper with the parts attached to the cover housing itself. The process for upgrading the upgraded cover housings similarly takes less than 10 minutes.

Example 3

RFID Start-Up Procedures

After technician upgrades a meter with an upgraded cover housing or an upgraded portion for an already upgraded cover housing, technician restarts the meter. The upgraded components scan the meter RFID tag and determine if that meter location is configured to have a sensor. If the meter is configured to have a sensor in that location, the upgraded cover housing or the upgraded portion will use either the meter's wireless radio or its own dedicated wireless radio to download a binding code from a remote management system. The binding code configures the meter, upgraded components, and sensors. The meter wirelessly connects to the new sensors. The meter display is reset, updated, and refreshed. The new meter is now ready for use.

Example 4

Environmental Pollution Sensor Network Through Parking Meters

Some upgraded cover housings or upgraded portions of cover housings contain various sensors capable of collecting environmental information. Technician upgrades meters around the city with sensors capable of detecting pollution, for instance carbon monoxide and carbon dioxide. The upgraded parking meters configure themselves as described in Example 3, and the meters begin to collect pollution information. The meters transmit this data to a remote server, which upgrades the database with the pollution information. Because meters throughout the entire city were upgraded with pollution sensors, the remote server database builds a pollution map of the city.

Example 5

Waking a Meter from Power Saving Mode and Priming Payment Methods

After a preset idle time, a parking meter enters a power saving mode. A car pulls into a parking spot managed by the parking meter. The sensors of the meter detect the presence of a vehicle and wake the meter from power saving mode to restore full functionality. The meter wirelessly retrieves a binding code and activates an integrated wireless payment receiver. The payment receiver is configured to accept payment through a variety of sources, for instance Apple Pay®, and is primed when the meter detects the presence of a newly-parked vehicle. The display screen is also updated upon retrieval of the binding code, allowing a user to easily pay after parking the vehicle.

Example 6

Meter Communication with City Personnel

A parking enforcement officer patrols the city hoping to hand out parking citations to meet her monthly quota. She carries a personal meter scanning device. As she approaches a parking meter, the meter's sensors detect the scanning device, and wirelessly connect to the remote management system to configure the meter to wirelessly transmit environmental information to the scanning device. The officer receives relevant environmental information in assisting her to issue parking citations, including meter identification, meter location, vehicle identification, license plate information, vehicle registration information, citation history, data indicating issuance of a citation, and data related to the type of citation issued.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:
1. A meter cover comprising:
   a. a removable cover housing configured to accommodate an upper portion of internal components of an existing meter, the cover housing engageable with a housing base of the existing meter to cover and enclose the internal components of the existing meter, wherein the cover housing comprises left and right flares, protruding at least partially to the left and right, respectively, from the removable cover housing and adapted to house one or more sensors;
   b. one or more sensors affixed to the left flare of the cover housing and housed in the left flare to collect information pertaining to the presence of a vehicle in a first local external environment to the left of the existing meter and one or more sensors affixed to the right flare of the cover housing and housed in the right flare to collect information pertaining to the presence of a vehicle in a second local external environment to the right of the existing meter, wherein the one or more sensors affixed to the left flare of the cover housing and the one or more sensors affixed to the right flare of the cover housing operate independently of each other;
   c. a wireless radio affixed to the cover housing, the wireless radio configured to transmit the information pertaining to the first and second local external environments to the existing meter or to a remote server in communication with the existing meter; and
   d. a power unit affixed to the cover housing, the power unit supplying power to the sensors and the wireless radio.
2. The meter cover of claim 1, wherein the meter is a parking meter.
3. The meter cover of claim 2, wherein the parking meter is a multi-space parking meter.
4. The meter cover of claim 1, wherein the one or more sensors affixed to the left flare of the cover housing and the one or more sensors affixed to the right flare of the cover housing comprise a radar.

5. The meter cover of claim 4, wherein the cover housing comprises a material that is at least partially radar transparent.

6. The meter cover of claim 1, wherein the one or more sensors affixed to the left flare of the cover housing or the one or more sensors affixed to the right flare of the cover housing are mounted on a gimbal to facilitate positioning.

7. The meter cover of claim 1, wherein the radio is a wireless radio that utilizes ISM-band, Wi-Fi, Bluetooth, or ZigBee.

8. The meter cover of claim 1, further comprising an RF reader affixed to the cover housing and configured to receive a meter identification from a wireless tag associated with the existing meter.

9. The meter cover of claim 8, wherein the wireless radio is further configured to transmit the meter identification in association with the information pertaining to the first and second local external environments of the existing meter.

10. The meter cover of claim 1, wherein the meter cover is operationally self-sufficient, the sensors, the wireless radio, and the power unit being not electrically connected to the existing meter.

11. The meter cover of claim 1, further comprising a payment accepting unit affixed to the cover housing.

12. The meter cover of claim 1, wherein at least one sensor is a camera.

13. A meter comprising:
a. a housing base;
b. a meter device at least partially disposed in the housing base;
c. a removable cover housing configured to accommodate an upper portion of internal components of an existing meter, the cover housing engageable with the housing base of the existing meter to cover and enclose the internal components of the existing meter, wherein the cover housing comprises left and right flares protruding at least partially to the left and right, respectively, from the removable cover housing and adapted to house one or more sensors;
d. one or more sensors affixed to left the flare of the cover housing and housed in the left flare to collect information pertaining to the presence of a vehicle in a first local external environment to the left of the existing meter and one or more sensors affixed to the right flare of the cover housing and housed in the right flare to collect information pertaining to the presence of a vehicle in a second local external environment to the right of the existing meter, wherein the one or more sensors affixed to the left flare of the cover housing and the one or more sensors affixed to right flare of the cover housing operate independently of each other;
e. a wireless radio affixed to the cover housing, the wireless radio configured to transmit the information pertaining to the first and second local external environments to the meter device or to a remote server in communication with the meter device; and
f. a power unit affixed to the cover housing, the power unit supplying power to the sensors and the wireless radio.

14. The meter of claim 13, wherein the meter is a parking meter.

15. The meter of claim 14, wherein the parking meter is a multi-space parking meter.

16. The meter of claim 13, wherein the one or more sensors affixed to the left flare of the cover housing and the one or more sensors affixed to the right flare of the cover housing comprise a radar.

17. The meter of claim 16, wherein the cover housing comprises a material that is at least partially radar transparent.

18. The meter of claim 13, wherein the one or more sensors affixed to the left flare of the cover housing or the one or more sensors affixed to the right flare of the cover housing are mounted on a gimbal to facilitate positioning.

19. The meter of claim 13, wherein the radio is a wireless radio that utilizes ISM-band, Wi-Fi, Bluetooth, or ZigBee.

20. The meter of claim 13, further comprising an RF reader affixed to the cover housing and configured to receive a meter identification from a wireless tag associated with the existing meter.

21. The meter of claim 20, wherein the wireless radio is further configured to transmit the meter identification in association with the information pertaining to the first and second local external environments of the existing meter.

22. The meter of claim 13, wherein the meter cover is operationally self-sufficient, the sensors, the wireless radio, and the power unit being not electrically connected to the meter device.

23. A methods of upgrading a meter comprising:
a. disengaging a cover housing from a housing base of an existing meter to expose an internal meter device;
b. removing the cover housing;
c. replacing the cover housing; and
d. engaging a replacement cover housing with the housing base to cover and enclose the meter device;
provided that the replacement cover housing comprises: left and right flares protruding at least partially to the left and right, respectively, from the removable cover housing and adapted to house one or more sensors; one or more sensors affixed to the left flare of the cover housing and housed in the left flare to collect information pertaining to the presence of a vehicle in a first local external environment to the left of the existing meter and one or more sensors affixed to the right flare of the cover housing and housed in the right flare to collect information pertaining to the presence of a vehicle in a second local external environment to the right of the existing meter, wherein the one or more sensors affixed to the left flare of the cover housing and the one or more sensors affixed to the right flare of the cover housing operate independently of each other; a wireless radio affixed to the cover housing, the wireless radio configured to transmit the environmental information to the meter device or to a remote server in communication with the meter device; and a power unit affixed to the cover housing, the power unit supplying power to the sensors and the wireless radio; whereby the meter is upgraded.

24. The method of claim 23, wherein the internal meter device of the existing meter is not replaced.

25. A methods of upgrading a meter comprising:
a. disengaging a portion of a cover housing from a cover housing of an existing meter;
b. removing the portion of the cover housing;
c. replacing the portion of the cover housing; and
d. engaging a replacement portion of the cover housing with the cover housing of the existing meter;
provided that an internal meter device of the existing meter is not replaced;
provided that the portion of the cover housing comprises less than 75%, 50%, or 25% of the cover housing;
provided that the replacement portion of the cover housing comprises: left and right flares protruding at least partially to the left and right, respectively, from the removable cover housing and adapted to house one or more sensors; one or more sensors affixed to the left flare of the cover housing and housed in the left flare to collect information pertaining to the presence of a vehicle in a first local external environment to the left of the existing meter and one or more sensors affixed to the right flare of the cover housing and housed in the right flare to collect information pertaining to the presence of a vehicle in a second local external environment to the right of the existing meter, wherein the one or more sensors affixed to the left flare of the cover housing and the one or more sensors affixed to the right flare of the cover housing operate independently of each other; a wireless radio affixed to the portion of the cover housing, the wireless radio configured to transmit the environmental information to the meter device or to a remote server in communication with the meter device; and a power unit affixed to the portion of the cover housing, the power unit supplying power to the sensor and the wireless radio; whereby the meter is upgraded.

26. The method of claim 25, wherein an internal meter device of the existing meter is not replaced.

* * * * *

UNITED STATES PATENT AND TRADEMARK OFFICE
CERTIFICATE OF CORRECTION

PATENT NO.        : 9,508,198 B1                                     Page 1 of 1
APPLICATION NO.   : 14/979104
DATED             : November 29, 2016
INVENTOR(S)       : King et al.

It is certified that error appears in the above-identified patent and that said Letters Patent is hereby corrected as shown below:

In the Claims

Column 18, Line 22, Claim 23, please delete "methods" and replace it with --method--

Column 18, Line 54, Claim 25, please delete "methods" and replace it with --method--

Signed and Sealed this
Twenty-eighth Day of March, 2017

Michelle K. Lee
*Director of the United States Patent and Trademark Office*